(12) United States Patent
Fu et al.

(10) Patent No.: US 12,308,973 B2
(45) Date of Patent: May 20, 2025

(54) RESOURCE SELECTION METHOD, APPARATUS AND DEVICE IN DATA TRANSMISSION

(71) Applicant: GUANGDONG OPPO MOBILE TELECOMMUNICATIONS CORP., LTD., Guangdong (CN)

(72) Inventors: Zhe Fu, Dongguan (CN); Haitao Li, Dongguan (CN); Xin You, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 413 days.

(21) Appl. No.: 17/853,651

(22) Filed: Jun. 29, 2022

(65) Prior Publication Data
US 2022/0337350 A1 Oct. 20, 2022

Related U.S. Application Data

(63) Continuation of application No. PCT/CN2020/074532, filed on Feb. 7, 2020.

(51) Int. Cl.
| | |
|---|---|
| *H04L 1/1812* | (2023.01) |
| *H04L 1/1822* | (2023.01) |
| *H04L 1/1867* | (2023.01) |
| *H04L 5/00* | (2006.01) |
| *H04W 72/02* | (2009.01) |

(Continued)

(52) U.S. Cl.
CPC ......... *H04L 1/1812* (2013.01); *H04L 5/0096* (2013.01); *H04W 72/02* (2013.01); *H04W 72/0453* (2013.01); *H04W 72/56* (2023.01)

(58) Field of Classification Search
CPC ... H04L 1/1812; H04L 5/0096; H04L 1/1887; H04L 1/1893; H04L 1/1822; H04W 72/02; H04W 72/0453; H04W 72/56
See application file for complete search history.

(56) References Cited

U.S. PATENT DOCUMENTS

| | | | |
|---|---|---|---|
| 2022/0159627 A1* | 5/2022 | Thomas | ............... H04W 48/16 |
| 2022/0239415 A1* | 7/2022 | Narayanan Thangaraj | ................. H04L 1/1896 |

FOREIGN PATENT DOCUMENTS

| | | |
|---|---|---|
| CN | 101098295 A | 1/2008 |
| CN | 101222303 A | 7/2008 |
| CN | 101998501 A | 3/2011 |

(Continued)

OTHER PUBLICATIONS

3GPP TSG-RAN WG2 Meeting R2-1911286 (Year: 2019).*

(Continued)

*Primary Examiner* — Harry H Kim
(74) *Attorney, Agent, or Firm* — Ladas & Parry, LLP

(57) ABSTRACT

Embodiments of the present application provide a data transmission method and apparatus, and a device, the method includes: a first device determining a target resource from multiple available resources according to states of HARQ processes corresponding to the multiple available resources respectively, and sends data to a second device on the target resource, and the second device receives the data on the target resource and processes the data. Transmission performance of services with different requirements can be ensured.

18 Claims, 8 Drawing Sheets

(51) Int. Cl.
  *H04W 72/0453* (2023.01)
  *H04W 72/56* (2023.01)

(56) References Cited

FOREIGN PATENT DOCUMENTS

| CN | 108631964 A | 10/2018 |
|---|---|---|
| CN | 108737036 A | 11/2018 |
| CN | 109644485 A | 4/2019 |
| CN | 110235494 A | 9/2019 |
| CN | 110447258 A | 11/2019 |
| EP | 4008077 A1 | 6/2022 |
| WO | 2016114587 A1 | 7/2016 |
| WO | 2018171773 A1 | 9/2018 |
| WO | 2019064983 A1 | 4/2019 |

OTHER PUBLICATIONS

The EESR of corresponding European application No. 20917663.5, dated Oct. 14, 2022.
Sony, Discussion on delay-tolerant HARQ for NTN, R1-1912349, 3GPP TSG RAN WG1 Meeting #99, Reno, USA, Nov. 18-22, 2019, entire document.
The second Office Action of corresponding European application No. 20917663.5, dated Dec. 22, 2023.
3GPP TS 38.321 V17.0.0 (Mar. 2022); 3rd Generation Partnership Project; Technical Specification Group Radio Access Network; NR; Medium Access Control (MAC) protocol specification(Release 17), entire document.
3GPP TS 38.331 V17.0.0 (Mar. 2022); 3rd Generation Partnership Project; Technical Specification Group Radio Access Network; NR; Radio Resource Control (RRC) protocol specification(Release 17), entire document.
International Search Report (ISR) dated Nov. 11, 2020 for Application No. PCT/CN2020/074532.
Written Opinion of the International Searching Authority dated Nov. 11, 2020 for Application No. PCT/CN2020/074532.
Lenovo HARQ design for UL grant-free URLLC transmission 3GPP TSG RAN WG1 NR Ad-Hoc Meeting R1-1700557 Jan. 20, 2017, entire document.
The first Office Action of corresponding European patent application No. 20917663.5, dated Jul. 5, 2023.
Nokia, Nokia Shanghai Bell, "Discussion on LCP procedure for NTN", R2-1911286, 3GPP TSG-RAN WG2 Meeting #106, Prague, Czech Republic, Aug. 26-30, 2019, all pages.
The first Office Action and search report of corresponding Chinese patent application No. 202211097960.5, dated May 11, 2024.
The second Office Action and search report of corresponding Chinese patent application No. 202211097960.5, dated Jul. 12, 2024.
The third Office Action of corresponding European patent application No. 20917663.5, dated Jun. 25, 2024.
The third Office Action of corresponding Chinese application No. 202211097960.5 dated on Sep. 12, 2024.

* cited by examiner

RESOURCE SELECTION METHOD, APPARATUS AND DEVICE IN DATA TRANSMISSION

CROSS-REFERENCE TO RELATED APPLICATIONS

This application is a continuation of International Application No. PCT/CN2020/074532, filed on Feb. 7, 2020, the disclosure of which is hereby incorporated by reference in its entirety.

TECHNICAL FIELD

The present application relates to the technical field of communication, and in particular, to a data transmission method and apparatus, and a device.

BACKGROUND

A non-terrestrial network (NTN) refers to a communication network between a terminal device and a satellite (also referred to as network device).

In an NTN system, a transmission delay between the terminal device and the network device is relatively large, thus introduction of a disable hybrid automatic repeat request (HARQ) function is discussed in a process of NTN standardization by 3GPP, so as to reduce the delay of data transmission. For multiple HARQ processes of the terminal device, a HARQ feedback function of a first part of the HARQ processes can be configured as an enable state, and a HARQ feedback function of a second part of the HARQ processes can be configured as a disable state. In such way, different HARQ processes can be adopted for quality of service (QoS) requirements of different services. For example, for a service sensitive to time delay, the second part of HARQ processes can be adopted for data transmission, and for a service that has a strict requirement for packet loss rate, the first part of HARQ processes can be adopted for data transmission.

When there is a resource conflict in the terminal device, for example, a conflict between a configured grant (CG) resource and a dynamic grant (DG) resource, the terminal device will preferentially select the DG resource for data transmission according to the existing protocol. However, as enable states of the HARQ processes corresponding to the CG resource and the DG resource may be different, the resource selected in such way may cause that the service QoS requirement cannot be satisfied.

SUMMARY

The embodiments of the present application provide a data transmission method and apparatus, and a device, which can ensure transmission performance of services with different requirements.

In a first aspect, an embodiment of the present application provides a data transmission method, including:
  determining, by a first device according to states of hybrid automatic repeat request HARQ processes corresponding to multiple available resources respectively, a target resource from the multiple available resources; and
  sending, by the first device, data to a second device on the target resource.

In a second aspect, an embodiment of the present application provides a data transmission method, including:
  receiving, by a second device, data sent by a first device on a target resource, wherein the target resource is determined by the first device according to states of hybrid automatic repeat request HARQ processes corresponding to multiple available resources respectively from the multiple available resources; and
  processing, by the second device, the data.

In a third aspect, an embodiment of the present application provides a data transmission apparatus, applied in a first device, the apparatus including:
  a processing module, configured to determine, according to states of hybrid automatic repeat request HARQ processes corresponding to multiple available resources respectively, a target resource from the multiple available resources; and
  a sending module, configured to send data to a second device on the target resource.

In a fourth aspect, an embodiment of the present application provides a data transmission apparatus, applied in a second device, the apparatus including:
  a receiving module, configured to receive data sent by a first device on a target resource, wherein the target resource is determined by the first device according to states of hybrid automatic repeat request HARQ processes corresponding to multiple available resources respectively from the multiple available resources; and
  a processing module, configured to process the data.

In a fifth aspect, an embodiment of the present application provides a terminal device, including: a transceiver, a processor and a memory;
  the memory stores a computer-executable instruction;
  the processor executes the computer-executable instruction stored in the memory, to cause the processor to execute the data transmission method according to any one of the first aspect or the second aspect.

In a sixth aspect, an embodiment of the present application provides a network device, including: a transceiver, a processor and a memory;
  the memory stores a computer-executable instruction;
  the processor executes the computer-executable instruction stored in the memory, to cause the processor to execute the data transmission method according to any one of the first aspect or the second aspect.

In a seventh aspect, an embodiment of the present application provides a computer-readable storage medium, where the computer-readable storage medium stores a computer-executable instruction, and the computer-executable instruction, when executed by a processor, is used to implement the data transmission method according to any one of the first aspect mentioned above.

In an eighth aspect, an embodiment of the present application provides a computer-readable storage medium, where the computer-readable storage medium stores a computer-executable instruction, and the computer-executable instruction, when executed by a processor, is used to implement the data transmission method according to any one of the second aspect mentioned above.

According to the data transmission method, apparatus and device provided by the embodiments of the present application, the first device determines the target resource from the multiple available resources according to the states of the HARQ processes corresponding to the multiple available resources respectively, and sends data to the second device on the target resource, and the second device receives the data on the target resource and processes the data. Since the target resource used by the first device to send data is selected according to enable/disable states of the HARQ processes corresponding to the available resources, an available resource corresponding to a HARQ process in the enable state or disable state can be selected according to the service QoS demands as the target resource, thereby ensuring the transmission performance of the service with different requirements.

DESCRIPTION OF EMBODIMENTS

Figure 1:
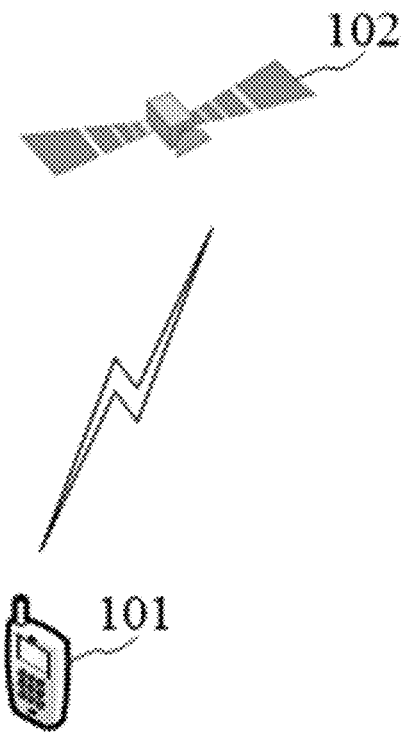
FIG. 1 is a schematic architectural diagram of a communication system provided by an embodiment of the present application.

To facilitate understanding, first of all, the related concepts in the present application will be described.

Terminal device: a terminal device usually has a wireless transceiving functions, and the terminal device can be deployed on land, including indoor or outdoor, handheld, wearable or vehicle-mounted; the terminal device can also be deployed on water surface (such as ships, etc.); the terminal device can also be deployed in the air (such as airplanes, balloons, satellites, etc.). The terminal device may be a mobile phone (mobile phone), a tablet computer (Pad), a computer with wireless transceiving function, a virtual reality (VR) terminal device, an augmented reality (AR) terminal device, a wireless terminal in industrial control, a vehicle-mounted terminal device, a wireless terminal in self-driving, a wireless terminal device in remote medical, a wireless terminal device in smart grid, a wireless terminal device in transportation safety, a wireless terminal device in smart city, a wireless terminal device in smart home, and a wearable terminal device, etc. The terminal device related to the embodiments of the present application can also be referred to as a terminal, a user equipment (UE), an access terminal device, a vehicle-mounted terminal, an industrial control terminal, a UE unit, a UE station, a mobile station, a mobile platform, a remote station, a remote terminal device, a mobile device, a UE terminal device, a wireless communication device, a UE agent or a UE apparatus, etc. The terminal device may be fixed or mobile.

Network device: a network device usually has wireless transceiving functions, and the network device may have mobile characteristics, for example, the network device may be a mobile device. In an embodiment, the network device may be a satellite, a balloon station. For example, the satellite may be a low earth orbit (LEO) satellite, a medium earth orbit (MEO) satellite, a geostationary earth orbit (GEO) satellite, a high elliptical orbit (HEO) satellite, etc. For example, an orbital altitude range of the LEO satellite is usually 500 km-1500 km, and an orbital period (a period of rotation around the earth) is about 1.5 hours-2 hours. A signal propagation delay of single-hop communication between users is about 20 ms, where the single-hop communication delay between users refers to a transmission delay between the terminal device and the network device, or a transmission delay between the network device and a transmission device. A maximum visible time of the satellite is about 20 minutes, where the maximum visible time refers to the longest time that a beam of the satellite covers a certain area of the ground. The LEO satellite moves relative to the ground, and with the movement of the satellite, the ground area covered by it also changes. The LEO satellite has a short signal propagation distance, less link loss, and low requirements for the transmission power of the terminal device. GEO satellite usually has an orbital altitude of 35786 km and an orbital period of 24 hours. The signal propagation delay of single-hop communication between users is about 250 ms. In order to ensure the coverage of satellites and improve the system capacity of communication networks, satellites can cover the ground with multiple beams. For example, a satellite can form tens or hundreds of beams to cover the ground, and one beam can cover the ground area with a diameter of tens to hundreds of kilometers. Certainly, the network device can also be a base station set up in land, water and other places. For example, the network device can be a next generation NodeB (gNB) or a next generation-evolved NodeB (ng-eNB). The gNB provides user plane function and control plane function of new radio (NR) for the UE, and ng-eNB provides user plane function and control plane function of evolved universal terrestrial radio access (E-UTRA) for the UE. It should be noted that gNB and ng-eNB are only names, which are used to represent base stations supporting 5G network systems, and they do not mean to limit. The network device may also be a base transceiver station (BTS) in a GSM system or a CDMA system, a base station (nodeB, NB) in a WCDMA system, or an evolutional node B (eNB or eNodeB) in an LTE system. Or, the network device may be a relay station, an access point, a vehicle-mounted device, a wearable device, a network-side device in a network after 5G, or a network device, a roadside site unit (road site unit, RSU), etc., in a future evolved PLMN network.

Non-terrestrial network (NTN): an NTN usually adopts satellite communication means to provide communication service to the users on land. Compared with terrestrial cellular network communication, satellite communication has many unique advantages. First of all, satellite communication is not limited by the user's region. For example, the general land communication cannot cover the ocean, mountains, deserts and other areas where communication devices cannot be set up or do not cover due to underpopulation. As for satellite communication, as a satellite can cover a relatively large ground area, and the satellite can orbit around the earth, theoretically every corner of the earth can be covered by satellite communication. Secondly, satellite communication has great social value. Satellite communication can be covered at a lower cost in remote mountainous areas and poor and backward countries or regions, so that people in these regions can enjoy advanced voice communication and mobile Internet technology, which is conducive to narrowing the digital gap with developed regions and promoting the development of such regions. Thirdly, the satellite communication has a long distance, and the communication cost does not increase obviously as the communication distance increases; finally, satellite communication has high stability and is not limited by natural disasters.

In the wireless communication system, in order to ensure the reliable data transmission, wireless communication adopts repeat mechanism. Taking an NR communication system as an example, NR adopts two-level repeat mechanisms: a hybrid automatic repeat request (HARQ) mechanism in a medium access control (MAC) layer and an automatic repeat request (ARQ) mechanism in a radio link control (RLC) layer. The repeat of lost or erroneous data is mainly handled by the HARQ mechanism of the MAC layer, and is supplemented by the repeat function of the RLC layer. The HARQ mechanism of the MAC layer can provide fast repeat, and the ARQ mechanism of the RLC layer can provide reliable data transmission.

For ARQ, a receiving end requests a sending end to repeat erroneous data messages to recover erroneous messages, which is one of the methods used in communication to deal with errors caused by a channel, and it is sometimes referred to as backward error correction (BEC).

The HARQ is a technology that combines forward error correction (FEC) and ARQ. In FEC, by addition of redundant information, the receiving end can correct some errors, so as to reduce the number of repeats. For errors that cannot be corrected by FEC, the receiving end will request the sending end to repeat the data through the ARQ mechanism.

The HARQ sends data by using a stop-and-wait protocol. In the stop-and-wait protocol, after sending a transport block (TB), the sending end will stop to wait for confirmation information. In such way, after each transmission, the sending end will stop and wait for confirmation information, which will lead to low user throughput. Therefore, the NR uses multiple parallel HARQ processes, and when one HARQ process is waiting for confirmation information, the sending end can use another HARQ process to continue to send data. These HARQ processes together form a HARQ entity, and this entity combines the stop-and-wait protocol, which allows continuous data transmission. The HARQ is divided into uplink HARQ and downlink HARQ. The uplink HARQ is for uplink data transmission, and the downlink HARQ is for downlink data transmission. The two are independent from each other.

Based on rules of the present NR protocol, the terminal device has a respective HARQ entity corresponding to each service cell. Each HARQ entity maintains a group of parallel downlink HARQ processes and a group of parallel uplink HARQ processes. At present, each uplink and downlink carrier supports for a maximum of 16 HARQ processes. The network device can indicate the maximum number of HARQ processes to the terminal device according to network deployment circumstances by radio resource control (RRC) signaling semi-persistent configuration. If the network device does not provide corresponding configuration parameters, then the default number of downlink HARQ processes is 8, and the maximum number of HARQ processes that can be supported by each uplink carrier is always 16. Each of the HARQ processes corresponds to one HARQ process ID. For downlink, a broadcast control channel (BCCH) uses a dedicated broadcast HARQ process. For uplink, the transmission of Msg3 in a random procedure uses HARQ ID 0.

For terminal devices that do not support downlink space division multiplexing, each downlink HARQ process only processes one TB simultaneously; for terminal devices that support downlink space division multiplexing, each downlink HARQ process may process one or two TBs simultaneously. Each uplink HARQ process of the terminal device processes one TB simultaneously.

The HARQ is divided into a synchronous type and an asynchronous type in the time domain, and is divided into a non-adaptive type and an adaptive type in the frequency domain. Both of uplink and downlink of NR use an asynchronous adaptive HARQ mechanism. With respect to asynchronous HARQ, repeat may occur at any moments, and a time interval between repeat and last-time transmission of the same TB is not fixed. With respect to adaptive HARQ, it is possible to change a frequency domain resource and a modulation and coding scheme (MCS) used for repeat.

To support transmission demands for different services, for different service characteristics, during resource configuration/scheduling in NR, occurrence of resource conflict is allowable. Taking uplink transmission as an example, for the same terminal device, at least two available resources for data transmission may exist in the time domain. When the terminal device does not have the capability to transmit multiple resources simultaneously, the terminal device needs to select a resource to be transmitted preferentially. The resource of the terminal device may include: a configured grant (CG) resource, or a dynamic grant (DG) resource.

The CG resource refers to a resource that is pre-configured for the terminal device by the network device. Illustratively, when configuring CG resources to the terminal device, the network device can indicate related parameters such as a period of the CG resource. Subsequently, the terminal device can send data on the CG resource according to the period of the CG resource, without being scheduled by the network device. The terminal device can determine a HARQ process corresponding to the CG resource according to parameters such as the period of the CG resource and the number of HARQ processes of the terminal device, etc.

DG resource refers to a resource dynamically configured for the terminal device by the network device. Illustratively, the network device can dynamically allocate a DG resource for the terminal device through the DCI, and indicate a HARQ process corresponding to the DG resource.

At present, the following circumstances of resource conflict are supported: CG-CG conflict, DG-DG conflict, and CG-DG conflict. In general, the most likely scenario in NTN is the CG-DG conflict. According to the present protocols, when CG-DG conflict occurs, DG is always transmitted prior to CG. That is, the terminal device preferentially selects the DG resource to transmit.

In the following, with reference to FIG. 1-FIG. 2, the architecture of the communication system in the present application will be described.

FIG. 1 is a schematic architectural diagram of a communication system provided by an embodiment of the present application. Referring to FIG. 1, a terminal device 101 and a satellite 102 are presented, wireless communication can be conducted between the terminal device 101 and the satellite 102. The network formed between the terminal device 101 and the satellite 102 can also be referred to as NTN. In the communication system architecture shown in FIG. 1, the satellite 102 has functions of the network device, the terminal device 101 can directly communicate with the satellite 102.

Figure 2:
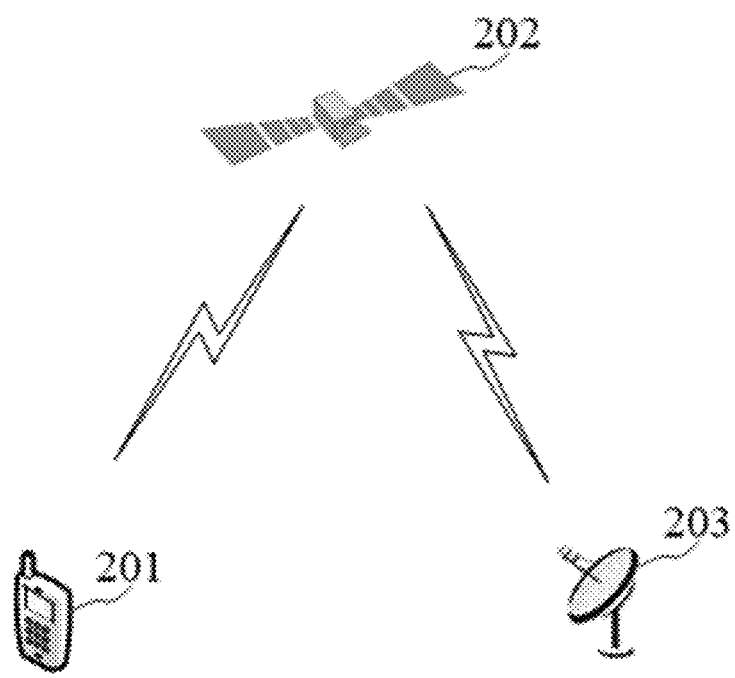
FIG. 2 is a schematic architectural diagram of another communication system provided by an embodiment of the present application.

FIG. 2 is a schematic architectural diagram of another communication system provided by an embodiment of the present application. Referring to FIG. 2, a terminal device 201, a satellite 202 and a network device 203 are presented, wireless communication can be conducted between the terminal device 201 and the satellite 202, and communication can be conducted between the satellite 202 and the network device 203. The network formed among the terminal device 201, the satellite 202 and the network device 203 can also be referred to as NTN. In the communication system architecture shown in FIG. 2, the satellite 202 does not have functions of the network device, and communication between the terminal device 101 and the network device 203 requires relay of the satellite 202.

As can be known from the network architecture as shown in FIG. 1 and FIG. 2, relative to a land communication system, wireless signal transmission between the terminal device and the network device in the NTN system has a large time delay. Therefore, introduction of a disable HARQ function is discussed in a process of NTN standardization by 3GPP, so as to reduce the delay of data transmission. Besides, configuration of the enable/disable HARQ function may be conducted based on the HARQ process. That is, for multiple HARQ processes of one terminal device, a HARQ feedback function of a part of the HARQ processes therein can be configured as an enable state, and the HARQ feedback function of another part of the HARQ processes therein can be configured as a disable state.

If the HARQ feedback function of a certain HARQ process is configured as the disable state, on the one hand, the network device may do not need to wait to receive uplink transmission of the terminal device (for the uplink HARQ, the network device does not need to wait to receive the uplink data transmission of the terminal device; for downlink HARQ, the network device does not need to wait to receive ACK/NACK feedback of the downlink data transmission for this HARQ process from the terminal), but to continue scheduling the HARQ process for data transmission, which can reduce the time delay of MAC transmission. On the other hand, as the network device will not schedule the HARQ process for repetition any more, reliability of the MAC transmission may be affected.

As different services have different quality of service (QoS) requirements, for example, some services are sensitive to time delay, and some services have strict requirements for packet loss rate, etc. In such way, HARQ processes in different enable/disable states can be adopted for QoS requirements of different services. For example, for services sensitive to time delay, the HARQ process with the HARQ feedback function in the disable state can be adopted for transmission, thereby reducing transmission delay. For services having strict requirements to packet loss rate, the HARQ process with the HARQ feedback function in the enable state can be adopted for transmission, thereby improving reliability of transmission.

When there are at least two resources in conflict in the terminal device, and such resources in conflict correspond to the HARQ process in the enable state and the HARQ process in the disable state respectively. If the terminal device still selects the resource to be preferentially transmitted according to the present rules (for example, when CG-DG conflict occurs, DG resource is selected for transmission preferentially), a HARQ process in the enable state may be selected for the service sensitive to time delay, or, a HARQ process in the disable state may be selected for the service having strict requirements on packet loss rate, which will lead to the problem that QoS requirement of the service cannot be satisfied.

In the embodiment of the present application, when the terminal device has multiple conflicting resources, the target resource to be preferentially transmitted is selected according to the enable/disable states of the HARQ processes corresponding to the multiple conflicting resources respectively, so that the selected target resource can satisfy the QoS requirement of the service, thereby ensuring transmission performance of services with different requirements.

In the following, the technical solution presented by the present application will be described in detail with reference to specific embodiments. It is to be noted that the following embodiments may exist alone, or be mutually combined, and the same or similar contents will not be repeated in different embodiments.

Figure 3:
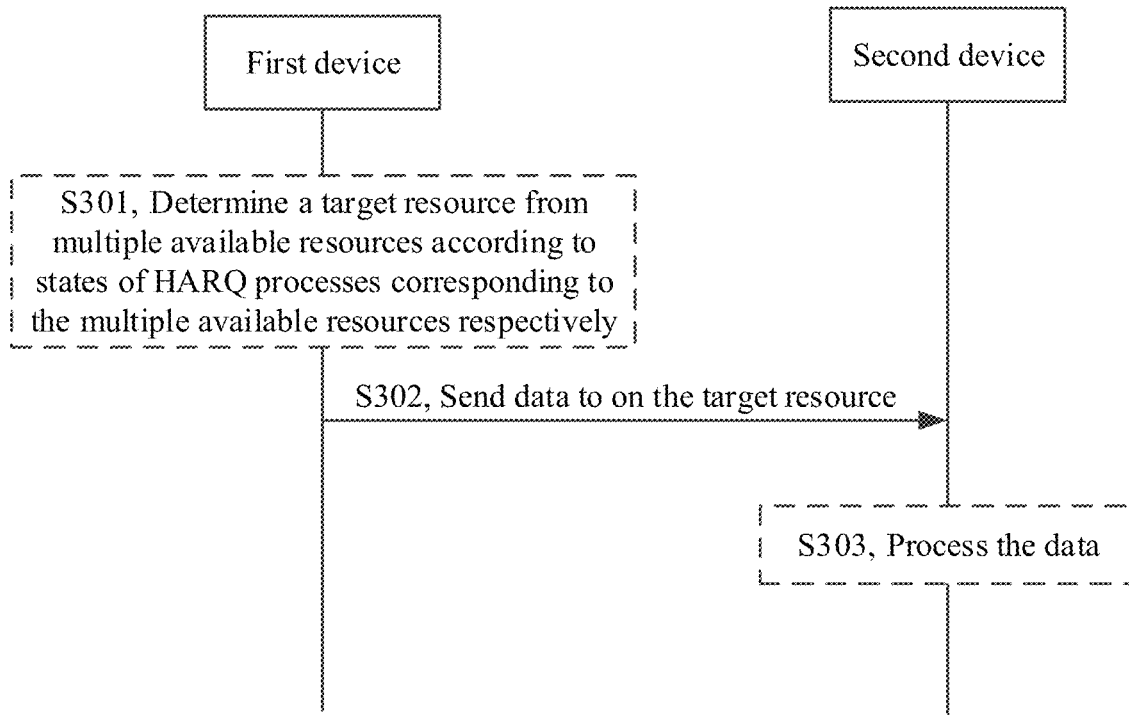
FIG. 3 is a schematic flow chart of a data transmission method provided by an embodiment of the present application.

FIG. 3 is a schematic flow chart of a data transmission method provided by an embodiment of the present application. Referring to FIG. 3, the method includes:

S301: a first device determines a target resource from multiple available resources according to states of HARQ processes corresponding to the multiple available resources respectively.

In the embodiment of the present application, the state of the HARQ process refers to a state of a HARQ feedback function of the HARQ process. The state of each of the HARQ processes is an enable state or a disable state. In the embodiment of the present application, the enable state may also be referred to as an enabled state, and the disable state may also be referred to as a disabled state. The state of the HARQ process being in the enable state refers to that the HARQ process enables the HARQ feedback function. That is, after transmitting data by using the HARQ process, the sending end needs to wait until receiving ACK/NACK feedback sent from the receiving end before using the HARQ process for data transmission again. The state of the HARQ process being in the disable state refers to that the HARQ process disables the HARQ feedback function. That is, after transmitting data by using the HARQ process, the sending end does not need to wait to receive ACK/NACK feedback of the receiving end, and the sending end can continue using the HARQ process for data transmission.

In the present embodiment, the first terminal may be a terminal device, and the second device may be a network device. Alternatively, the first device may be a network device, and the second device may be a terminal device. That is, the present embodiment can be applied in side link/uplink data transmission process, or downlink data transmission process.

In the embodiment of the present application, in a certain moment, the first device has multiple available resources.

The available resource can also be referred to as a conflicting resource, that is, for the first device, at least two resources overlap at least in the time domain. In an embodiment, the multiple available resources may include: CG resource(s), and/or, DG resource(s). That is, the multiple available resources may be multiple CG resources; or the multiple available resources may be multiple DG resources; or the multiple available resources include CG resource(s) and DG resource(s) simultaneously. In an embodiment, the available resources of the present embodiment may further include downlink semi-persistent scheduling (SPS) resources.

Each available resource of the first device corresponds to one HARQ process, and the state of the HARQ process may be in the enable state or disable state. In any transmission moment, when the first device has multiple available resources, the first device can determine the target resource used for preferential data transmission from the multiple available resources according to the states of the HARQ processes corresponding to the multiple available resources respectively.

In one example, when determining the target resource from the multiple available resources, the first device can preferentially select an available resource corresponding to a HARQ process in the enable state as the target resource. For example, assuming that the first device has two available resources, and a resource 1 corresponds a HARQ process in the enable state, and a resource 2 corresponds to a HARQ process in the disable state, then the first device selects the resource 1 as the target resource.

In another example, when determining the target resource from the multiple available resources, the first device can preferentially select an available resource corresponding to the HARQ process in the disable state as the target resource. For example, assuming that the first device has two available resources, and a resource 1 corresponds a HARQ process in the enable state, and a resource 2 corresponds to a HARQ process in the disable state, then the first device selects the resource 2 as the target resource.

In another examples, for services with different QoS requirements, the first device can adopt different preferential selection manners. For example, for services sensitive to time delay, the first device will preferentially select the HARQ process in the disable state; for services having strict requirements on packet loss rate, the first device will preferentially select the HARQ process in the enable state.

It is to be noted that, in the above respective examples, whether the first device preferentially selects the HARQ process in the enable state or preferentially selects the HARQ process in the disable state can be determined by the first device itself, or be determined by the second device and indicated by the second device to the first device, or, certainly, be agreed in advance by the first device and the second device, which is not limited by the present embodiment.

In addition, in the present embodiment, if the first device selects multiple target resources according to the states of the HARQ processes corresponding to the multiple available resources respectively, then the first device can further continue selecting according to other information of these target resources to finally determine the resource to be used for data transmission, which is not limited by the present embodiment.

In can be understood that, before S301, the first device needs to acquire the states of the HARQ processes corresponding to the multiple available resources respectively. In the following, manners for the first device to acquire the states of the HARQ processes corresponding to the multiple available resources will be described.

When the first device is a terminal device, the states of the HARQ processes corresponding to the respective available resources can be acquired in several manners in the following:

Manner 1: the terminal device acquires first configuration information from the network device, where the first configuration information is used to indicate the states of the HARQ processes corresponding to the respective available resources. The first configuration information may include any one of the following information:

a state of a HARQ process configured for the terminal device; or the state of the HARQ process corresponding to the available resource (for example, the state of the HARQ process corresponding to the CG resource, or the state of the HARQ process corresponding to the DG resource).

In an embodiment, the terminal device can receive second information from the network device, where the second information includes the first configuration information. The second information may be any one of the following information: RRC configuration information, MAC control element (CE) information, downlink control information (DCI).

In an example, the RRC configuration information that the terminal device receives from the network device may include: enable/disable states of the HARQ processes configured for the terminal device, the number of HARQ processes configured for the terminal device, the state of the HARQ feedback function configured for each of the HARQ processes (may also be referred to as HARQ enable state, for example, at least one HARQ process is in the enable state/disable state, or enabled state/disabled state). Alternatively, the RRC configuration information may include: configuring the state of the HARQ feedback function corresponding to at least one GG (or CG group) resource of the terminal device.

In another example, the DCI that the terminal device receives from the network device may include: a DG resource scheduled for the terminal device, and a HARQ process ID corresponding to the DG resource. In an embodiment, in DCI, the network device can simultaneously indicate the state of the HARQ feedback function of the HARQ process corresponding to the DG resource. In an embodiment, in DCI, the network device can activate the CG resource; or indicate or update the state(s) of the HARQ feedback function(s) of the HARQ process(es) corresponding to one or more available resources.

In another example, the above first configuration information is carried in the MAC CE. For example, when the network device sends a downlink TB to the terminal device, the first configuration information is carried in the MAC CE of the downlink TB. The types of the MAC CE carrying the first configuration information are not limited by the present embodiment.

Manner 2: predefining the first configuration information.

The predefined first configuration information may be preset, or agreed by the protocol. For example, the terminal device independently determines the states of the HARQ feedback functions of the respective HARQ processes.

The predefined first configuration information can be stored in the terminal device locally, and when the terminal device acquires the first configuration information, the terminal device can acquire the first configuration information locally.

In the above two manners, in manner 1, the first configuration information may be totally determined by the network device, and in manner 2, the first configuration information may be totally determined by the terminal device. Certainly, in practical application procedures, the above two manners may be used in combination. For example, the terminal device pre-configures the states of the HARQ feedback functions of the respective HARQ processes, the network device can send configuration information to the terminal device according to actual needs to change the states of the HARQ feedback functions of some HARQ processes. That is, the first configuration information may be determined by both the terminal device and the network device.

When the first device is a network device, the network device can acquire the first configuration information through the following manner: the network device can predefine the first configuration information. The predefined first configuration information may be preset, or agreed by the protocol.

In some scenarios, circumstances may occur that the states of the HARQ feedback functions of some HARQ processes may not be configured. For the HARQ processes of which the states of the HARQ feedback functions are not configured, the first device can take them as in the enable state by default, or in the disable state by default. It is usually processed according to the former one, that is, the manner of legacy.

S302: the first device sends data to a second device on the target resource.

S303: the second device processes the data.

The first device sends data to the second device on the determined target resource, and correspondingly, the second device receives the data on the target resource, and processes the received data. The way that the first device sends data to the second device and the way that the second device processes the data are similar to those in the prior art, which will not be repeated here.

According to the data transmission method provided by the present embodiment, the first device determines the target resource from the multiple available resources according to the states of the HARQ processes corresponding to the multiple available resources respectively, and sends data to the second device on the target resource, and the second device receives the data on the target resource and processes the data. Since the target resource used by the first device to send data is selected according to the enable/disable states of the HARQ processes corresponding to the available resources, an available resource corresponding to a HARQ process in the enable state or disable state can be selected according to the service QoS demands as the target resource, thereby ensuring the transmission performance of the service with different requirements.

Several possible implementations of the embodiments of the present application will be described in the following with reference to FIG. 4-FIG. 9.

Figure 4:
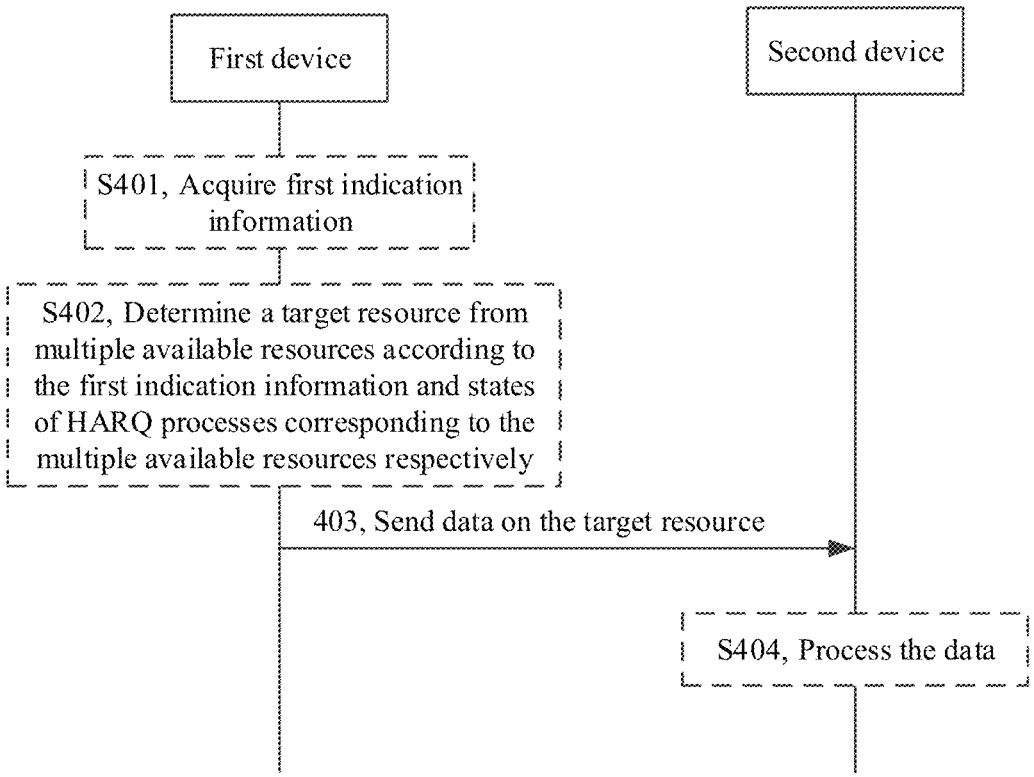
FIG. 4 is a schematic flow chart of another data transmission method provided by an embodiment of the present application.

FIG. 4 is a schematic flow chart of another data transmission method provided by an embodiment of the present application. As shown in FIG. 4, the method may include:

S401, a first device acquires first indication information.

The first indication information is used to indicate preferential selection of an available resource corresponding to a HARQ process in an enable state as the target resource, or, is used to indicate preferential selection of an available resource corresponding to a HARQ process in a disable state as the target resource.

Similar to the embodiment shown in FIG. 3, in the present embodiment, the first device may be a terminal device, and the second device may be a network device, or the first device may be a network device, and the second device may be a terminal device.

In an embodiment, when first devices are different, ways that the first device acquires the first indication information may also be different. In the following, ways that the first device acquires the first indication information will be described in the following.

When the first device is a terminal device, the first device may acquire the first indication information in the following manners.

Manner 1: the terminal device acquires the first indication information from the network device.

In an embodiment, the terminal device receives first information from the network device, where the first information includes the first indication information. The first information may be any one of the following information: RRC configuration information, MAC CE, and DCI.

It is to be noted that, forms of the first indication information are not limited by the embodiments of the present application. The first indication information can be represented by introducing dedicated information, or multiplexing existing fields or adding new fields in the existing dedicated information. For example, a field of 1 bit may be adopted. If the field takes a value of 0, it represents preferential selection of the available resource corresponding to the HARQ process in the disable state as the target resource, and if the field takes a value of 1, it represents preferential selection of the available resource corresponding to the HARQ process in the enable state as the target resource.

In an embodiment, the first indication information may also simultaneously indicate an effective time period corresponding to the preferential selection manner. In one example, the effective time period may include a start moment and/or an end moment. For example, the network device can indicate preferential selection of the HARQ process in the enable state from a moment 1, or preferential selection of the HARQ process in the disable state before a moment 2. In another example, the effective time period may include duration information, for example, the network device can indicate preferential selection of the HARQ process in the enable state in 5 seconds after the terminal device receives the first indication information.

Manner 2: the terminal device predefines the first indication information.

The first indication information may be preset by the terminal device, or be agreed by protocol.

In one example, it can be clearly stated in the protocol to preferentially use the HARQ process in the enable state for data transmission, or to preferentially use the HARQ process in the disable state for transmission.

In another example, selection priorities of the HARQ process in the enable state and the HARQ process in the disable state can be agreed. For example, it is agreed that the selection priority of the HARQ process in the enable state is higher than the selection priority of the HARQ process in the disable state, then the terminal device preferentially selects the HARQ process in the enable state; or it is agreed that the selection priority of the HARQ process in the disable state is higher than the selection priority of the HARQ process in the enable state, then the terminal device preferentially selects the HARQ process in the disable state.

In another example, it can also be agreed that different preferential selection manners are adapted in different conditions. For example, it is agreed that in a first condition, the HARQ process in the enable state is preferentially selected, and in a second condition, the HARQ process in the disable state is preferentially selected.

In the above manner 1, the first indication information is determined by the network device, and the network device sends the first indication information to the terminal device. In such way, the terminal device can determine to preferentially select the HARQ process in the enable state/disable state based on the first indication information sent by the network device, so as to ensure that the terminal device is controllable, and ensure the high efficiency of the scheduling transmission of the network device. In the above manner 2, the first indication information can be determined by the terminal device, thus increasing implementation flexibility of the terminal device.

S402: the first device determines a target resource from multiple available resources according to the first indication information and states of HARQ processes corresponding to the multiple available resources respectively.

In the present embodiment, at each transmission moment, when the first device has multiple available resources, the first device can determine the target resource from the multiple available resources according to the first indication information and states of the HARQ processes corresponding to the multiple available resources respectively.

In the following, an example is taken where the first device has both the CG resource and the DG resource at a certain transmission moment to describe several possible circumstances for resource selection. It is to be noted that, the conflict between the CG resource and the DG resource is only taken as an example here, and it is also applicable to the conflict between the CG resources and the conflict between the DG resources.

(1) The first indication information indicates preferential selection of the HARQ process in the disable state. If the HARQ process corresponding to the CG resource is in the disable state, and the HARQ process corresponding to the DG resource is in the enable state, then the first device preferentially selects the HARQ process in the disable state for data transmission, that is, preferentially selects the CG resource as the target resource.

(2) The first indication information indicates preferential selection of the HARQ process in the enable state. If the HARQ process corresponding to the CG resource is in the disable state, and the HARQ process corresponding to the DG resource is in the enable state, then the first device preferentially selects the HARQ process in the enable state for data transmission, that is, preferentially selects the DG resource as the target resource.

(3) The first indication information indicates preferential selection of the HARQ process in the enable state. If both the HARQ processes corresponding to the CG resource and the DG resource are in the enable state, then the first device preferentially selects the HARQ process corresponding to the DG resource for data transmission, that is, preferentially selects the DG resource as the target resource.

(4) The first indication information indicates preferential selection of the HARQ process in the disable state. If the HARQ process corresponding to the CG resource is in the disable state, and the HARQ process corresponding to the DG resource is not configured with the state of the HARQ feedback function (at this time, it can be processed in a legacy way, that is, the HARQ process corresponding to the DG resource is deemed to be in the enable state), then the first device preferentially selects the HARQ process in the disable state for data transmission, that is, preferentially selects the CG resource as the target resource.

In the following, an example is taken where there is a conflict between CG resources in the first device (for example, a first CG resource and a second CG resource) at a certain transmission moment to describe several possible circumstances for resource selection.

(1) The first indication information indicates preferential selection of the HARQ process in the disable state. If the HARQ process corresponding to the first CG resource is in the disable state, and the HARQ process corresponding to the second CG resource is in the enable state, then the first device preferentially selects the HARQ process in the disable state for data transmission, that is, preferentially selects the first CG resource as the target resource.

(2) The first indication information indicates preferential selection of the HARQ process in the enable state. If the HARQ process corresponding to the first CG resource is in the disable state, and the HARQ process corresponding to the second CG resource is in the enable state, then the first device preferentially selects the HARQ process in the enable state for data transmission, that is, preferentially selects the second CG resource as the target resource.

(3) The first indication information indicates preferential selection of the HARQ process in the enable state. If both HARQ processes corresponding to the first CG resource and the second CG resource are in the enable state, then the first device can further perform selection according to other resource selection manners, reference can be made to the subsequent description in detail (manner 1 to manner 4) for several possible resource selection manners, which will not be repeated here.

(4) The first indication information indicates preferential selection of the HARQ process in the disable state. If the HARQ process corresponding to the first CG resource is in the disable state, and the HARQ process corresponding to the second CG resource is not configured with the state of the HARQ feedback function (at this time, it can be processed in a legacy way, that is, the HARQ process corresponding to the second CG resource is deemed to be in the enable state), then the first device preferentially selects the HARQ process in the disable state for data transmission, that is, preferentially selects the first CG resource as the target resource.

In the following, an example is taken where there is a conflict between DG resources in the first device (for example, a first DG resource and a second DG resource) at a certain transmission moment to describe several possible circumstances for resource selection.

(1) The first indication information indicates preferential selection of the HARQ process in the disable state. If the HARQ process corresponding to the first DG resource is in the disable state, and the HARQ process corresponding to the second DG resource is in the enable state, then the first device preferentially selects the HARQ process in the disable state for data transmission, that is, preferentially selects the first DG resource as the target resource.

(2) The first indication information indicates preferential selection of the HARQ process in the enable state. If the HARQ process corresponding to the first DG resource is in the disable state, and the HARQ process corresponding to the second DG resource is in the enable state, then the first device preferentially selects the HARQ process in the enable state for data transmission, that is, preferentially selects the second DG resource as the target resource.

(3) The first indication information indicates preferential selection of the HARQ process in the enable state. If both the HARQ processes corresponding to the first DG resource and the second DG resource are in the enable state, then the first device can further perform selection according to other resource selection manners, reference can be made to the subsequent description in detail (manner 1 to manner 4) for several possible resource selection manners, which will not be repeated here.

(4) The first indication information indicates preferential selection of the HARQ process in the disable state. If the HARQ process corresponding to the first DG resource is in the disable state, and the HARQ process corresponding to the second DG resource is not configured with the state of the HARQ feedback function (at this time, it can be processed in a legacy way, that is, the HARQ process corresponding to the second DG resource is deemed to be in the enable state), then the first device preferentially selects the HARQ process in the disable state for data transmission, that is, preferentially selects the first DG resource as the target resource.

In the present embodiment, if the first device selects multiple target resources according to the first indication information and states of the HARQ processes corresponding to the multiple available resources respectively, then the first device can further continue selecting according to other information of these target resources to determine the final resource to be used for data transmission. Several possible implementations are provided in the following.

Manner 1: perform selection according to a resource type, for example, DG resource can be preferentially selected. That is, when the target resources selected according to S402 include both the CG resource and the DG resource, the DG resource is preferentially selected as the final target resource for data transmission.

Manner 2: perform selection according to data amounts that the respective resources can transmit. For example, the resource over which a largest data amount can be transmitted is selected as the final target resource for data transmission.

Manner 3: perform selection according to a criterion that repeat is preferential than the new transmission. That is, the resource for repeat is selected as the final target resource.

Manner 4: perform selection randomly or a selection manner implemented by UE. That is, when there are multiple target resources selected according to S402, a resource is randomly selected from the multiple resources as the final target resource for data transmission.

It should be understood that, in practical applications, the above 4 selection manners can be used in combination. In an embodiment, the above 4 selection manners may have corresponding priorities, and the first device can adopt the above 4 manners for selection in sequence according to their priorities, until only one target resource is finally determined.

S403: the first device sends data to a second device on the target resource.

S404: the second device processes the data.

Figure 5:
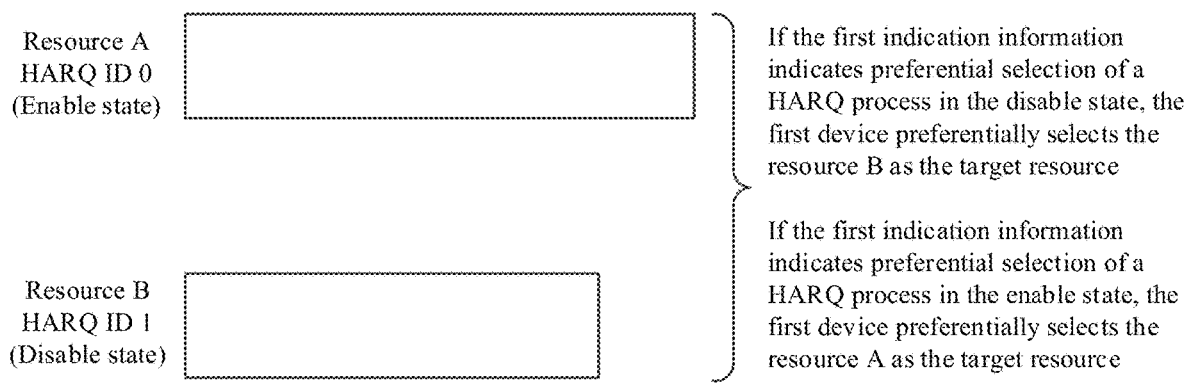
FIG. 5 is a schematic diagram of a resource selection procedure provided by an embodiment of the present application.

Description will be made according to a specific example in the following with reference to FIG. 5. FIG. 5 is a schematic diagram of a resource selection procedure provided by an embodiment of the present application. As shown in FIG. 5, it is assumed that the first device has two available resources, a resource A and a resource B respectively. The resource A corresponds to a HARQ process 0, and the resource B corresponds to a HARQ process 1. The HARQ process 0 is in the enable state, and the HARQ process 1 is in the disable state. If the first indication information indicates preferential selection of the HARQ process in the disable state, then the first device preferentially selects the resource B as the target resource; if the first indication information indicates preferential selection of the HARQ process in the enable state, then the first device preferentially selects the resource A as the target resource.

According to the data transmission method provided by the present embodiment, the first device determines a target resource from the multiple available resources according to the first indication information and states of HARQ processes corresponding to multiple available resources respectively, so as to ensure the transmission performance of services with different requirements. When the first indication information is from the network device, it is ensured that the terminal device is controllable, and high efficiency of the scheduling transmission of the network device is also ensured. When the first indication information is determined by the terminal device, the implementation flexibility of the terminal device is increased.

In some application scenarios, on premise that the first device selects the target resource based on the states of the HARQ processes corresponding to the available resources, the selection can also be performed with reference to other information of the available resources. One possible implementation is provided in the following with reference to FIG. 6.

Figure 6:
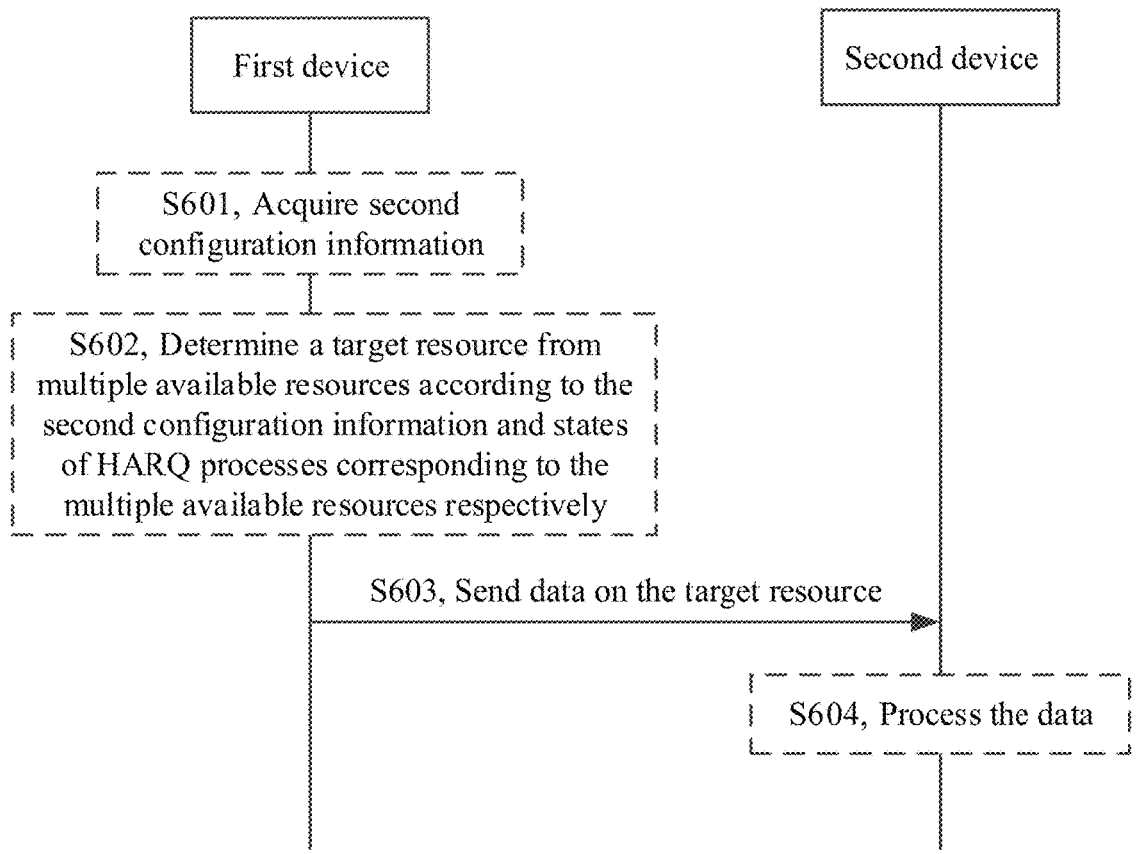
FIG. 6 is a schematic flow chart of another data transmission method provided by an embodiment of the present application.

FIG. 6 is a schematic flow chart of another data transmission method provided by an embodiment of the present application. As shown in FIG. 6, the method of the present embodiment may include:

S601, a first device acquires second indication information.

In the present embodiment, the second configuration information is used to indicate configuration information of a logical channel. In an embodiment, the second configuration information may include: an attribute and/or priority of at least one logical channel.

The attribute of each logical channel is any one of the following: enable HARQ feedback function (activate a HARQ feedback function), disable HARQ feedback function (deactivate a HARQ feedback function), enable or disable HARQ feedback function (activate or deactivate a HARQ feedback function). It should be understood that, the attribute of a logical channel is "enable HARQ feedback function", then it indicates that data of the logical channel needs to be carried in a resource corresponding to a HARQ process in the enable state for transmission. The attribute of a logical channel is "disable HARQ feedback function", then it indicates that the data of the logical channel needs to be carried in a resource corresponding to a HARQ process in the disable state for transmission. The attribute of a logical channel is "enable or disable HARQ feedback function", then it indicates that the data of the logical channel can be carried in the resource corresponding to the HARQ process in the enable state for transmission, or can be carried in the resource corresponding to the HARQ process in the disable state for transmission.

It should be noted that, for the logical channel of which the attribute is not configured, the first device can take the attribute of the logical channel as "enable HARQ feedback function" by default, or take the attribute of the logical channel as "disable HARQ feedback function" by default, or take the attribute of the logical channel as "enable or disable HARQ feedback function" by default.

The priority of the logical channel is used to indicate the priority sequence of the data of the logical channel to be transmitted. When data of multiple logical channels needs to be transmitted, and the total amount of the data of the multiple the logical channels exceeds the transmission capability at the moment, it needs to be determined from one or more logical channels according to the priorities of the logical channels, data of which logical channel is to be transmitted preferentially.

Similar to the above embodiment, in the present embodiment, the first device may be a terminal device, and a second device may be a network device, or the first device may be a network device, and the second device may be a terminal device.

In an embodiment, when first devices are different, ways that the first device acquires the second configuration information may also be different. In the following, ways that the first device acquires the second configuration information will be described in the following.

When the first device is the terminal device, the terminal device can receive dedicated information from the network device, and the dedicated information includes the second configuration information. The dedicated information may be any one of the following information: RRC configuration information, MAC CE, DCI.

When the first device is the network device, the network device can predefine the second configuration information. The predefined second configuration information may be preset, or may be agreed by the protocol.

S602: the first device determines a target resource from multiple available resources according to the second configuration information and states of HARQ processes corresponding to the multiple available resources respectively.

S603: the first device sends data to the second device on the target resource.

S604: the second device processes the data.

In the present embodiment, the first device can determine the target resource from the multiple available resources according to the attribute and/or the priority of the at least one logical channel. The first device can also determine the target resource from the multiple available resources according to the attribute and/or the priority of the at least one logical channel, and the states of the HARQ processes corresponding to the multiple available resources respectively.

In one possible implementation, the first device determines the target resource from the multiple available resources according to the attribute of the at least one logical channel and the states of the HARQ processes corresponding to the multiple available resources respectively.

In an example, logical channels that can be carried on the respective available resources can be first determined according to the attribute of the at least one logical channel. For example, if the state of the HARQ process corresponding to a certain available resource is the enable state, then the available resource can carry a logical channel of which the attribute is "enable HARQ feedback function", and can also carry a logical channel of which the attribute is "enable or disable HARQ feedback function". For example, if the state of the HARQ process corresponding to a certain available resource is the disable state, then the available resource can carry a logical channel of which the attribute is "disable HARQ feedback function", and can also carry a logical channel of which the attribute is "enable or disable HARQ feedback function". The target resource is then determined from the multiple available resources according to the states of the HARQ processes corresponding to the multiple available resources respectively. For example, it can be determined independently or according to the first indication information to select the available resource corresponding to the HARQ process in the enable state as the target resource, or to select the available resource corresponding to the HARQ process in the disable state as the target resource. In such way, after the target resource is determined, the logical channel that can be carried on the target resource is also determined. In addition, it is ensured that the state of the HARQ process corresponding to the target resource matches with the attribute of the logical channel carried thereon.

In another example, the target resource can be first determined from the multiple available resources according to the states of the HARQ processes corresponding to the multiple available resources respectively. For example, it can be determined independently or according to the first indication information to select the available resource corresponding to the HARQ process in the enable state as the target resource, or to select the available resource corresponding to the HARQ process in the disable state as the target resource. The logical channel that can be carried on the target resource is then determined according to the attribute of the at least one logical channel. For example, if the state of the HARQ process corresponding to the target resource is the enable state, then the target resource can carry a logical channel of which the attribute is "enable HARQ feedback function", and can also carry a logical channel of which the attribute is "enable or disable HARQ feedback function". If the state of the HARQ process corresponding to the target resource is the disable state, then the target resource can carry a logical channel of which the attribute is "disable HARQ feedback function", and can also carry a logical channel of which the attribute is "enable or disable HARQ feedback function".

In the respective examples above, on the basis that the target resource and the logical channel carried on the target resource are determined, if the state of the HARQ process corresponding to the target resource matches with the attributes of these logical channels, then it indicates that these logical channels can be carried on the target resource for transmission, or it indicates that these logical channels can be sent by using the HARQ process corresponding to the target resource. In other words, the target resources determined in the respective examples above have the following characteristics: the state of the HARQ process corresponding to the target resource at least matches with the attribute of the logical channel to which the data belongs.

Figure 7:
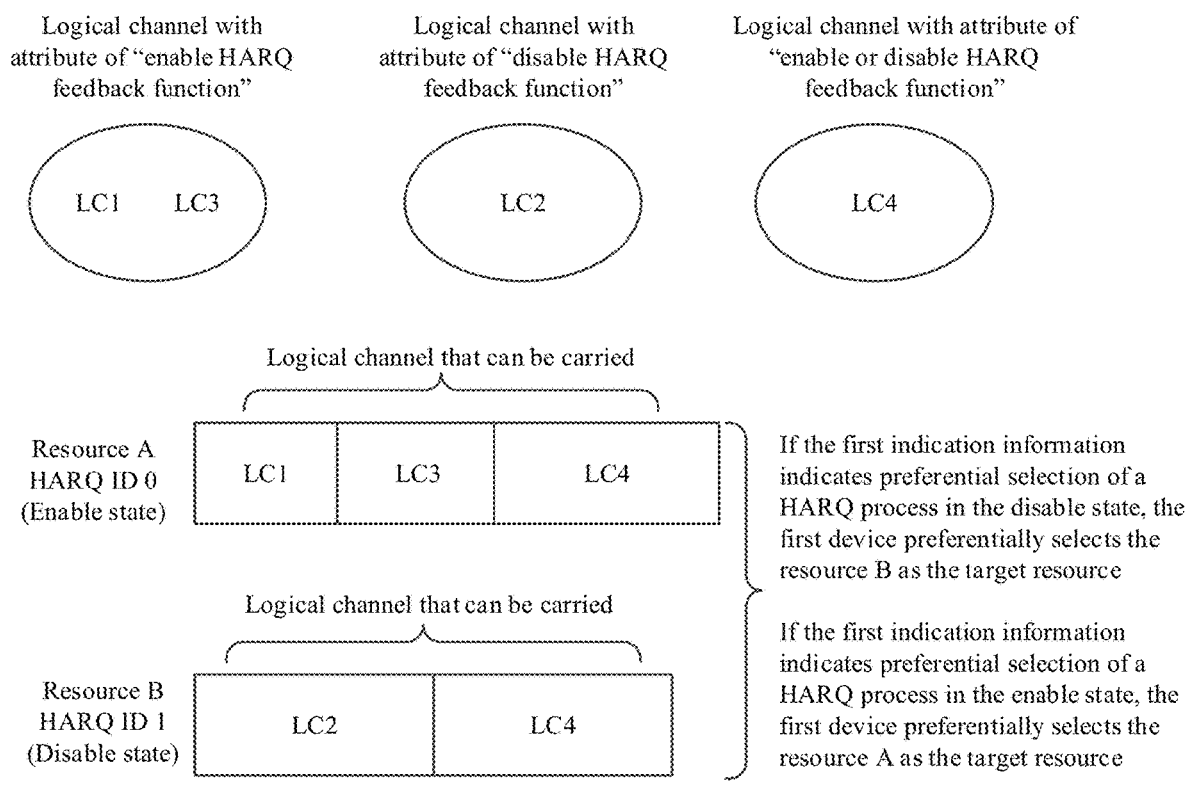
FIG. 7 is a schematic diagram of another resource selection procedure provided by an embodiment of the present application.

Description will be made with reference to a specific example in the following. FIG. 7 is a schematic diagram of another resource selection procedure provided by an embodiment of the present application. As shown in FIG. 7, it is assumed that the data to be transmitted by the first device includes 4 logical channels, which are LC1, LC2, LC3 and LC4 respectively. The attributes of LC1 and LC3 are both "enable HARQ feedback function", the attribute of LC2 is "disable HARQ feedback function", and the attribute of LC4 is "enable or disable HARQ feedback function". The first device has two available resources, a resource A and a resource B respectively. The resource A corresponds to a HARQ process 0, and the resource B corresponds to a HARQ process 1. The HARQ process 0 is in the enable state, and the HARQ process 1 is in the disable state. According to the attributes of LC1-LC4, it can be determined that the logical channels that can be carried on the resource A include LC1, LC3 and LC4, and the logical channels that can be carried on the resource B include LC2 and LC4. If the first indication information indicates preferential selection of the HARQ process in the enable state, then the first device preferentially selects the resource A as the target resource, and the data of LC1, LC3 and LC4 is carried on the target resource; if the first indication information indicates preferential selection of the HARQ process in the disable state, then the first device preferentially selects the resource B as the target resource, and the data of LC2 and LC4 is carried on the target resource. It can be seen that the state of the HARQ process corresponding to the target resource determined by the present embodiment matches with the attribute of the logical channel to which the data belongs.

It needs to be noted that, in the above respective examples, when determining the logical channel that can be carried on a certain resource, in addition to determining the attribute of the logical channel, other mapping strategies between the logical channels and the resources can also be taken into account, which will not be limited and repeated by the present embodiment.

In another possible implementation, the first device determines the target resource from the multiple available resources according to the priority of the at least one logical channel and the states of the HARQ processes corresponding to the multiple available resources respectively.

In practical applications, resource selection can first be performed based on the priority of the logical channel, and if there are still multiple selected resources, further selection is performed based on the states of the HARQ processes corresponding to these resources. Alternatively, resource selection can also be performed based on the states of the HARQ processes corresponding to the available resources, and if there are still multiple selected resources, further selection is performed based on the priority of the logical channel.

In another possible implementation, the first device determines the target resource from the multiple available resources according to the attribute and the priority of the at least one logical channel and the states of the HARQ processes corresponding to the multiple available resources respectively.

In practical applications, resource selection can first be performed based on the attribute and the priority of the logical channel, and if there are still multiple selected resources, further selection is performed based on the states of the HARQ processes corresponding to these resources. Alternatively, resource selection can also be performed based on the states of the HARQ processes corresponding to the available resources, and if there are still multiple selected resources, further selection is performed based on the attribute and the priority of the logical channel. Several possible resource selection manners will be described below.

Resource selection manner 1: the first device first performs first step of selection, determines the candidate resource(s) from the multiple available resources according to the states of the HARQ processes corresponding to the multiple available resources respectively. It can be understood that, the procedure of the first-step selection is similar to the embodiments shown in FIG. 3 or FIG. 4, which will not be repeated here. If only one candidate resource is determined in the first step, then the candidate resource is taken as the target resource. If multiple candidate resources are determined in the first step, then the first device continues to perform the second step of selection, determines the target resource from the multiple candidate resources according to the attribute and the priority of the at least one logical channel.

The procedure of the second-step selection may include: the first device determines the logical channels that can be carried on the respective candidate resources according to the attribute of the at least one logical channel, and determines the target resource from the multiple candidate resources according to the priorities of the logical channels that can be carried on the respective candidate resources. Illustratively, any one of the following manners can be adopted for determining the target resource from the multiple candidate resources in the second step:

(1) determining from the multiple candidate resources, a candidate resource over which a logical channel with a highest priority among the logical channels can be carried as the target resource;

(2) determining from the multiple candidate resources, a candidate resource over which a logical channel with a priority within a preset range can be carried as the target resource;

(3) determining from the multiple candidate resources, a candidate resource over which a logical channel with a priority within a preset range having a largest data amount among the logical channels can be carried as the target resource.

In this resource selection manner, another expression of the second step may also be that the target resource determined from the multiple candidate resources satisfies any one of the following conditions:

(1) the priority of the logical channel that can be carried on the target resource is the highest among the priorities of the logical channels that can be carried on the multiple candidate resources;

(2) the priority of the logical channel that can be carried on the target resource is within the preset range;

(3) the priority of the logical channel that can be carried on the target resource is within a preset range, and the data amount of the logical channel that can be carried on the target resource is largest.

Figure 8:
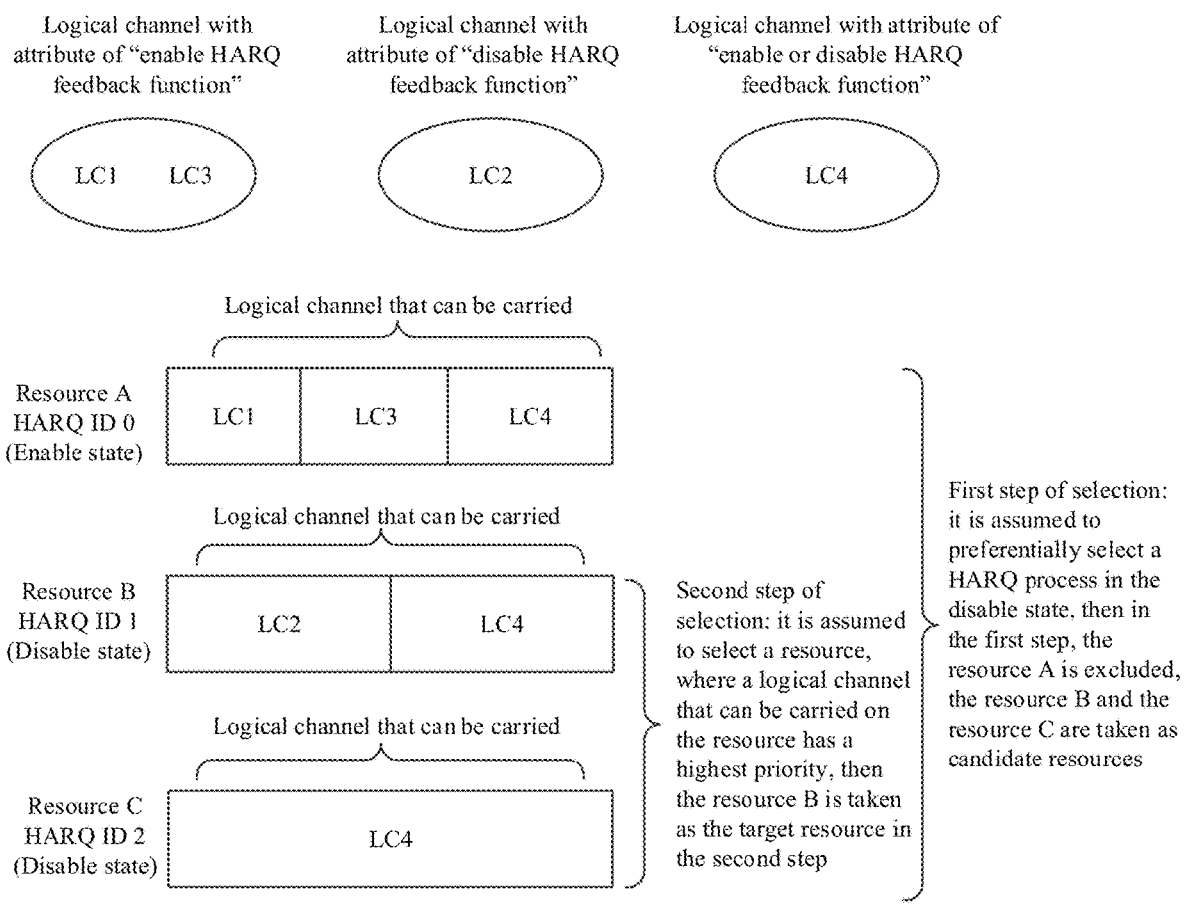
FIG. 8 is a schematic diagram of another resource selection procedure provided by an embodiment of the present application.

Resource selection manner 1 will be described with reference to a specific example in the following. FIG. 8 is a schematic diagram of another resource selection procedure provided by an embodiment of the present application. As shown in FIG. 8, it is assumed that the data to be transmitted by the first device includes 4 logical channels, which are LC1, LC2, LC3 and LC4 respectively. The attributes of LC1 and LC3 are both "enable HARQ feedback function", the attribute of LC2 is "disable HARQ feedback function", and the attribute of LC4 is "enable or disable HARQ feedback function". The first device has three available resources, which are a resource A, a resource B and a resource C respectively. The resource A corresponds to a HARQ process 0, the resource B corresponds to a HARQ process 1, and the resource C corresponds to a HARQ process 2. The HARQ process 0 is in the enable state, and the HARQ process 1 and the HARQ process 2 are in the disable state. According to the attributes of LC1-LC4 and the mapping strategy between the logical channels and the resources, it can be determined that the logical channels that can be carried on the resource A include LC1, LC3 and LC4, the logical channels that can be carried on the resource B include LC2 and LC4, and the logical channels that can be carried on the resource C include LC4.

Still referring to FIG. 8, in the first step of selection, it is assumed that the terminal device determines independently or determines according to the first indication information to preferentially select the HARQ process in the enable state, thus the resource A can be excluded in the first step, and the resource B and the resource C are taken as candidate resources. In the second step of selection, the first device can select a resource as the target resource, where a logical channel that can be carried on this resource has the highest priority. Since the highest priority that can be carried on the resource B is LC2, the highest priority that can be carried on the resource C is LC4, and LC2>LC4, thus the resource B is selected as the target resource in the second step of selection, and the data carried on LC2 and LC4 is carried on the target resource.

Resource selection manner 2: the first step first performs first step of selection, determines the candidate resource(s) from the multiple available resources according to the attribute and the priority of the at least one logical channel. If only one candidate resource is determined in the first step, then this candidate resource is taken as the target resource. If there are multiple candidate resources determined in the first step, then the first device continues to perform the second step of selection, determines the target device from the multiple candidate devices according to the states of the HARQ processes corresponding to the multiple candidate resources respectively. It can be understood that, the procedure of the second-step selection is similar to the embodiments shown in FIG. 3 or FIG. 4, which will not be repeated here.

The procedure of the first-step selection may include: the first device determines the logical channels that can be carried on the respective available resources according to the attribute of the at least one logical channel, and determines the candidate resource from the multiple available resources according to the priorities of the logical channels that can be carried on the respective available resources. Illustratively, any one of the following manners can be adopted for determining the candidate resource from the multiple available resources in the first step:

(1) determining from the multiple available resources, an available resource over which a logical channel with a highest priority among the logical channels can be carried as the candidate resource;
(2) determining from the multiple available resources, an available resource over which a logical channel with a priority within a preset range can be carried as the candidate resource;
(3) determining from the multiple available resources, an available resource over which a logical channel with a priority within a preset range having a largest data amount among the logical channels can be carried as the candidate resource.

In this resource selection manner, another expression of the first step may also be that the candidate resource determined from the multiple available resources satisfies any one of the following conditions:
(1) the logical channel that can be carried on the candidate resource is the highest among the priorities of the logical channels that can be carried on the multiple available resources;
(2) the priority of the logical channel that can be carried on the candidate resource is within the preset range;
(3) the priority of the logical channel that can be carried on the candidate resource is within a preset range, and the data amount of the logical channels that can be carried on the candidate resource is largest.

Figure 9:
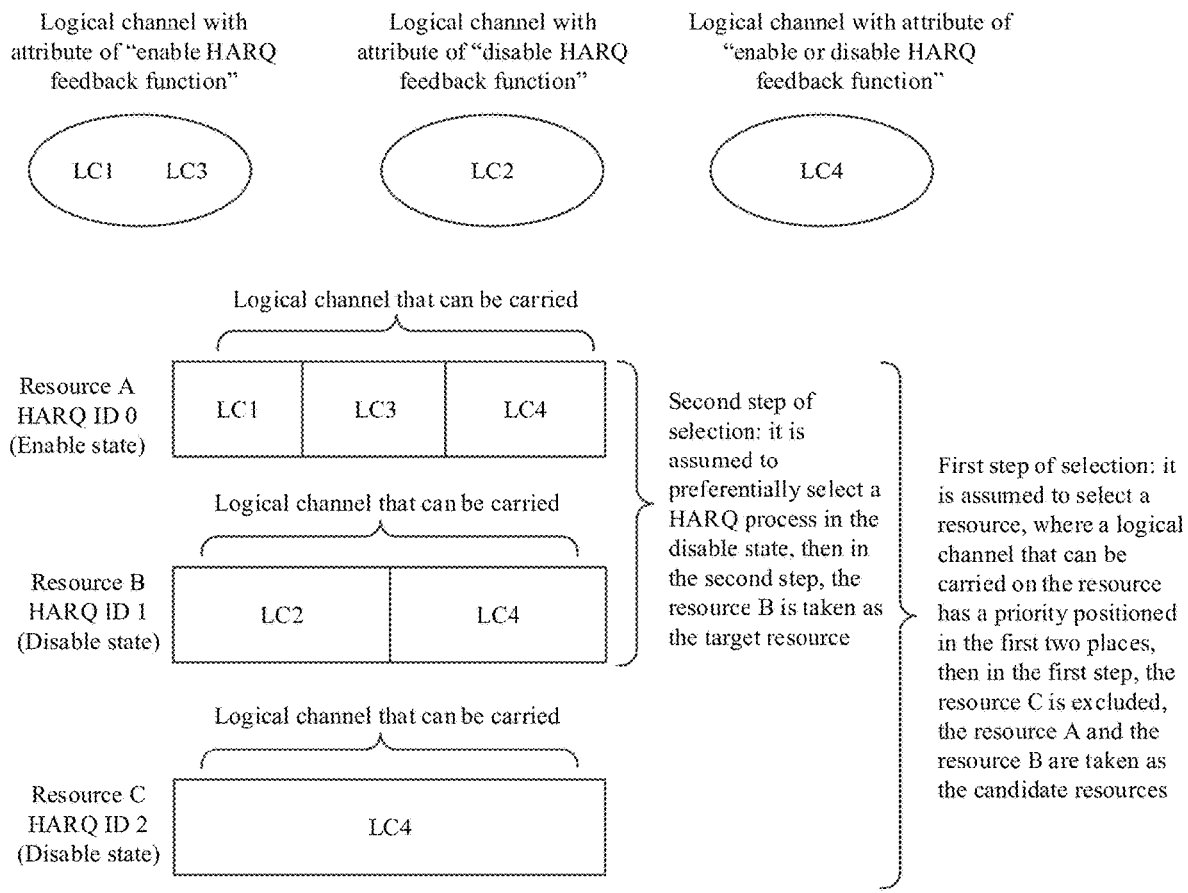
FIG. 9 is a schematic diagram of another resource selection procedure provided by an embodiment of the present application.

Resource selection manner 2 will be described with reference to a specific example in the following. FIG. 9 is a schematic diagram of another resource selection procedure provided by an embodiment of the present application. As shown in FIG. 9, it is assumed that the data to be transmitted by the first device includes 4 logical channels, which are LC1, LC2, LC3 and LC4 respectively. The attributes of LC1 and LC3 are both "enable HARQ feedback function", the attribute of LC2 is "disable HARQ feedback function", and the attribute of LC4 is "enable or disable HARQ feedback function". The first device has three available resources, which are a resource A, a resource B and a resource C respectively. The resource A corresponds to a HARQ process 0, the resource B corresponds to a HARQ process 1, and the resource C corresponds to a HARQ process 2. The HARQ process 0 is in the enable state, and the HARQ process 1 and the HARQ process 2 are in the disable state. According to the attributes of LC1-LC4 and the mapping strategy between the logical channels and the resources, it can be determined that the logical channels that can be carried on the resource A include LC1, LC3 and LC4, the logical channels that can be carried on the resource B include LC2 and LC4, and the logical channels that can be carried on the resource C include LC4.

In the first step of selection, it is assumed that the first device determines available resources which can carry a logical channel having a priority positioned in the first two places (that is, can carry LC1 or LC2) as the candidate resources, in this way, the resource C can be excluded in the first step, and the resource A and the resource B are taken as the candidate resources. In the second step of selection, it is assumed that the first device determines to select the HARQ process in the disable state independently or according to the first indication information, in this way, the resource A is excluded in the second step of selection, and the resource B is taken as the target resource, and the data of LC2 and LC4 is carried on the target resource.

In the respective resource selection manners above, if there are still multiple target resources determined after the first step and second step of selections, then the first device can continue to select according to other information of these target resources to determine the final target resource for data transmission. Several possible implementations are provided in the following.

Manner 1: perform selection according to a resource type, for example, a DG resource can be preferentially selected. That is, when the target resource selected according to S602 includes both the CG resource and the DG resource, the DG resource is preferentially selected as the final target resource for data transmission.

Manner 2: perform selection according to data amounts that the respective resources can transmit. For example, a resource which can transmit the largest data amount is selected as the final target resource for data transmission.

Manner 3: perform selection according to a criterion that repeat is preferential than the new transmission. That is, the resource for repeat is selected as the final target resource.

Manner 4: perform selection randomly or perform selection UE implementation. That is, when there are multiple target resources selected according to S602, a resource is randomly selected from the multiple resources as the final target resource for data transmission.

Manner 5: perform selection according to the second-highest priority of the logical channel that can be carried. For example, the resource B and the resource C are taken as the candidate resources after the first step of selection, and the highest priorities of the logical channels that can be carried on the resource B and the resource C are the same, then selection can be performed according to the second-highest priorities of the logical channels that can be carried on the resource B and the resource C. If the second-highest priority of the logical channel that can be carried on the resource B is higher than the second-highest priority of the logical channel that can be carried on the resource C, then the resource B is selected.

It should be understood that, in practical applications, the above 5 selection manners can be used in combination. In an embodiment, the above 5 selection manners may have corresponding priorities, and the first device can adopt the above 5 manners for selection in sequence according to their priorities, until only one target resource is finally determined.

In an embodiment, before S602, the first device can further acquire second indication information, where the second indication information is used to indicate the resource selection manner adopted by the first device, and the resource selection manner is any one of the following: performing resource selection according to the attribute and/or the priority of the logical channel first, then performing resource selection according to the states of the HARQ processes corresponding to the available resources; or, performing resource selection according to the states of the HARQ processes corresponding to the available resources first, then performing resource selection according to the attribute and/or the priority of the logical channel. That is, the second indication information is used to indicate adoption of the above resource selection manner 1, or is used to indicate adoption of the above resource selection manner 2.

In an embodiment, the first device can further acquire third indication information, where the third indication information is used to indicate the condition that the selected resource needs to satisfy when resource selection is performed according to the attribute and/or the priority of the logical channel. That is, the third indication information is used to indicate any one of the following conditions: a priority of a logical channel that can be carried is highest; or a priority of a logical channel that can be carried is within a preset range; or a priority of a logical channel that can be carried is within a present range, and a data amount of the logical channel that can be carried is largest.

In an embodiment, both the second indication information and the third indication information above can be predefined, for example, the first device sets the second indication information and the third indication information in advance, or the second indication information and the third indication information are agreed in protocol.

In an embodiment, when the first device is a terminal device, and the second indication information and the third indication information can also be indicated by the network device. Illustratively, the first device receives dedicated information from the second device, where the dedicated information includes the second indication information and/or the third indication information. The dedicated information may be any one of the following information: RRC configuration information, DCI, MAC CE.

In some possible implementations, in the case that the data to be transmitted includes MAC CE, one or more MAC CE configurations can be used to indicate the attribute of the enable state of the HARQ feedback function.

Illustratively, the first device acquires the third configuration information. The third configuration information is used to indicate configuration information of the MAC CE. The third configuration information may include: the attribute of the at least one MAC CE; where the attribute of each MAC CE is any one of the following: enable HARQ feedback function (activate HARQ feedback function), disable HARQ feedback function (deactivate HARQ feedback function), enable or disable HARQ feedback function (activate or deactivate HARQ feedback function).

It should be understood that, the attribute of a MAC CE is "enable HARQ feedback function", then it indicates that the MAC CE needs to be carried in a resource corresponding to a HARQ process in the enable state for transmission. The attribute of a MAC CE is "disable HARQ feedback function", then it indicates that the MAC CE needs to be carried in a resource corresponding to a HARQ process in the disable state for transmission. The attribute of a MAC CE is "enable or disable HARQ feedback function", then it indicates that the MAC CE can be carried in the resource corresponding to the HARQ process in the enable state for transmission, or can be carried in the resource corresponding to the HARQ process in the disable state for transmission.

It should be noted that, for the MAC CE of which the attribute is not configured, the first device can take the attribute of the MAC CE as "enable HARQ feedback function" by default, or take that the attribute of the MAC CE as "disable HARQ feedback function" by default, or take that the attribute of the MAC CE as "enable or disable HARQ feedback function" by default.

When the first device is the terminal device, the terminal device can receive dedicated information from the network device, and the dedicated information includes the third configuration information. The dedicated information may be any one of the following information: RRC configuration information, MAC CE, DCI.

When the first device is the network device, the network device can predefine the third configuration information. The predefined third configuration information may be preset, or may be agreed by the protocol.

In the case that the first device acquires the attribute of the MAC CE, the first device can consider the attributes of the respective MAC CEs when performing resource selection, so that the state of the HARQ process corresponding to the selected target resource matches with the attribute of the MAC CE in the data. Description will be made with reference to two examples in the following.

In an example, MAC CEs that the respective available resources can carry can be first determined according to the attribute of the at least one MAC CE. For example, if the state of the HARQ process corresponding to a certain available resource is the enable state, then the available resource can carry a MAC CE of which the attribute is "enable HARQ feedback function", and can also carry a MAC CE of which the attribute is "enable or disable HARQ feedback function". For example, if the state of the HARQ process corresponding to a certain available resource is the disable state, then the available resource can carry a MAC CE of which the attribute is "disable HARQ feedback function", and can also carry a MAC CE of which the attribute is "enable or disable HARQ feedback function". The target resource is then determined from the multiple available resources according to the states of the HARQ processes corresponding to the multiple available resources respectively. For example, it can be determined independently or according to the first indication information to select the available resource corresponding to the HARQ process in the enable state as the target resource, or to select the available resource corresponding to the HARQ process in the disable state as the target resource. In such way, after the target resource is determined, the MAC CE that can be carried on the target resource is also determined. In addition, it is ensured that the state of the HARQ process corresponding to the target resource matches with the attribute of the MAC CE carried thereon.

In another example, the target resource can be first determined from the multiple available resources according to the states of the HARQ processes corresponding to the multiple available resources respectively. For example, it can be determined independently or according to the first indication information to select the available resource corresponding to the HARQ process in the enable state as the target resource, or to select the available resource corresponding to the HARQ process in the disable state as the target resource. The MAC CE that the target resource can carry is then determined according to the attribute of the at least one MAC CE. For example, if the state of the HARQ process corresponding to the target resource is the enable state, then the target resource can carry a MAC CE of which the attribute is "enable HARQ feedback function", and can also carry a MAC CE of which the attribute is "enable or disable HARQ feedback function". If the state of the HARQ process corresponding to the target resource is the disable state, then the target resource can carry a MAC CE of which the attribute is "disable HARQ feedback function", and can also carry a MAC CE of which the attribute is "enable or disable HARQ feedback function".

In the respective examples above, on the basis that the target resource and the MAC CE carried on the target resource are determined, if the state of the HARQ process corresponding to the target resource matches with the attributes of these MAC CE, then it indicates that these MAC CE can be carried on the target resource for transmission, or it indicates that these MAC CE can be sent by using the HARQ process corresponding to the target resource. In other words, the target resources determined in the respective examples above have the following characteristics: the state of the HARQ process corresponding to the target resource at least matches with the attribute of the MAC CE in the data.

In the embodiment shown in FIG. 6-FIG. 9, the first device selects the target resource from the multiple available resources according to the attribute and/or the priority of the at least one logical channel and the states of the HARQ processes corresponding to the multiple available resources, so the transmission performance of services with different requirements can be ensured; at the same time, the implementation flexibility of the terminal device is ensured, and the high efficiency of the service transmission is ensured.

Figure 10:
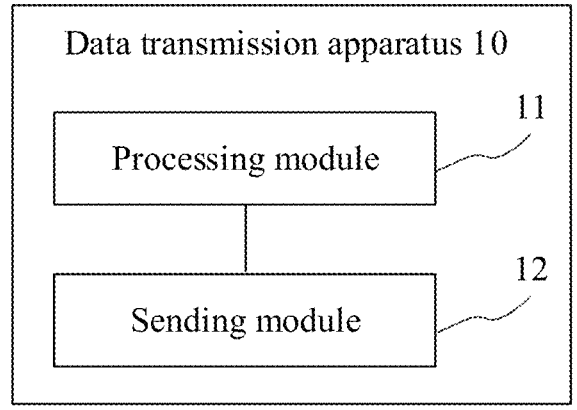
FIG. 10 is a schematic structural diagram of a data transmission apparatus provided by an embodiment of the present application.

FIG. 10 is a schematic structural diagram of a data transmission apparatus provided by an embodiment of the present application. The data transmission apparatus 10 can be provided in the first device, and the first device can be a terminal device or a network device. Referring to FIG. 10, the data transmission apparatus 10 includes a processing module 11 and a sending module 12, where, the processing module 11 is configured to determine, according to states of hybrid automatic repeat request HARQ processes corresponding to multiple available resources respectively, a target resource from the multiple available resources; and the sending module 12 is configured to send data to a second device on the target resource.

The data transmission apparatus provided by the embodiment of the present application can implement the technical solution described in the above method embodiments, and the implementation principle and beneficial effect thereof are similar, which will not be repeated here.

In one possible implementation, the state of each of the HARQ processes is enable state or disable state.

In a possible implementation, the processing module 11 is further configured to: acquire first configuration information, where the first configuration information includes any one of the following information:

a state of a HARQ process configured for the first device; or, the state of the HARQ process corresponding to the available resource.

In a possible implementation, the processing module 11 is further configured to: acquire first indication information, where the first indication information is used to indicate preferential selection of an available resource corresponding to a HARQ process in an enable state as the target resource, or, is used to indicate preferential selection of an available resource corresponding to a HARQ process in a disable state as the target resource;

correspondingly, the processing module 11 is specifically configured to: determine, according to the first indication information and the states of the HARQ processes corresponding to the multiple available resources respectively, the target resource from the multiple available resources.

In a possible implementation, the processing module 11 is further configured to: acquire second configuration information, where the second configuration information includes an attribute of at least one logical channel; where the attribute of each logical channel is any one of the following: enable HARQ feedback function, disable HARQ feedback function, enable or disable HARQ feedback function;

correspondingly, a state of a HARQ process corresponding to the target resource matches with an attribute of a logical channel to which the data belongs.

In a possible implementation, the second configuration information further includes a priority of the at least one logical channel; the processing module 11 is specifically configured to:

determine, according to the attribute and/or the priority of the at least one logical channel, and the states of the HARQ processes corresponding to the multiple available resources respectively, the target resource from the multiple available resources.

In a possible implementation, the processing module 11 is specifically configured to:

determine, according to the states of the HARQ processes corresponding to the multiple available resources respectively, a candidate resource from the multiple available resources;

if a number of the determined candidate resources is multiple, determine, according to the attribute and/or the priority of the at least one logical channel, the target resource from the multiple candidate resources.

In a possible implementation, the processing module 11 is specifically configured to:

determine, according to the attribute of the at least one logical channel, logical channels that can be carried on the respective candidate resources;

determine from the multiple candidate resources, a candidate resource over which a logical channel with a highest priority among the logical channels can be carried as the target resource; or, determine from the multiple candidate resources, a candidate resource over which a logical channel with a priority within a preset range can be carried as the target resource; or, determine from the multiple candidate resources, a candidate resource over which a logical channel with a priority within a preset range having a largest data amount among the logical channels can be carried as the target resource.

In a possible implementation, the processing module 11 is specifically configured to:

determine, according to the attribute and/or the priority of the at least one logical channel, a candidate resource from the multiple available resources;

if a number of the determined candidate resources is multiple, determine, according to the states of the HARQ processes corresponding to the candidate resources, the target resource from the multiple candidate resources.

In a possible implementation, the processing module 11 is specifically configured to:

determine, according to the attribute of the at least one logical channel, logical channels that can be carried on the respective available resources;

determine from the multiple available resources, an available resource over which a logical channel with a highest priority among the logical channels can be carried as the candidate resource; or, determine from the multiple available resources, an available resource over which a logical channel with a priority within a preset range can be carried as the candidate resource; or, determine from the multiple available resources, an available resource over which a logical channel with a priority within a preset range having a largest data amount among the logical channels can be carried as the candidate resource.

In a possible implementation, the processing module 11 is further configured to:

acquire third configuration information, where the third configuration information includes: an attribute of at least one media access control MAC control element CE; where the attribute of each MAC CE is any one of the following: enable HARQ feedback function, disable HARQ feedback function, enable or disable HARQ feedback function;

correspondingly, a state of a HARQ process corresponding to the target resource matches with an attribute of a MAC CE in the data.

In a possible implementation, the first device is a terminal device, and the second device is a network device; or the first device is a network device, and the second device is a terminal device.

Figure 11:
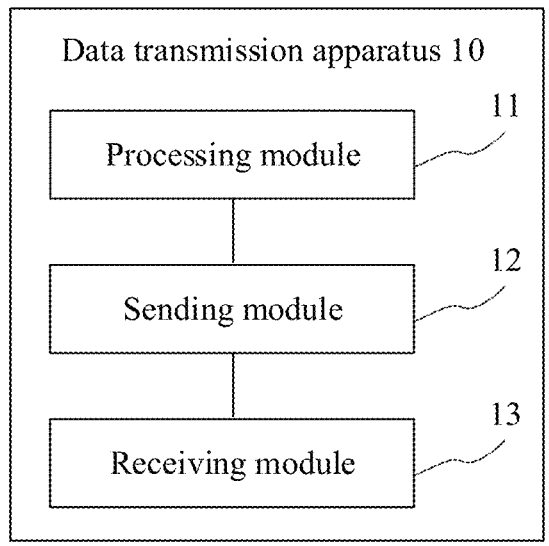
FIG. 11 is a schematic structural diagram of another data transmission apparatus provided by an embodiment of the present application.

FIG. 11 is a schematic structural diagram of another data transmission apparatus provided by an embodiment of the present application. On the basis of the embodiment shown in FIG. 10, referring to FIG. 11, the data transmission apparatus 10 further includes a receiving module 13, where the receiving module 13 is configured to receive first information from the second device, where the first information includes the first indication information, and the first information is any one of the following: downlink control information DCI, MAC CE, and radio resource control RRC configuration information.

In a possible implementation, the receiving module 13 is configured to receive second information from the second device, where the second information includes the first configuration information, and the second information is any one of the following: RRC configuration information, MAC CE, DCI.

In a possible implementation, the receiving module 13 is configured to receive dedicated information from the second device, where the dedicated information includes the second configuration information.

In a possible implementation, the receiving module 13 is configured to receive dedicated information from the second device, where the dedicated information includes the third configuration information.

In a possible implementation, the processing module 11 is further configured to:

acquire second indication information, where the second indication information is used to indicate a resource selection manner, and the resource selection manner is any one of the following:

performing resource selection according to the attribute and/or the priority of the logical channel first, then performing resource selection according to the states of the HARQ processes corresponding to the available resources; or, performing resource selection according to the states of the HARQ processes corresponding to the available resources first, and then performing resource selection according to the attribute and/or the priority of the logical channel.

In a possible implementation, the processing module 11 is further configured to:

acquire third indication information, where the third indication information is used to indicate that a resource which is selected according to the attribute and/or the priority of the logical channel satisfies any one of the following conditions:

a priority of a logical channel that can be carried on the resource is highest; or;

a priority of a logical channel that can be carried on the resource is within a preset range; or;

a priority of a logical channel that can be carried on the resource is within a preset range, and a data amount of the logical channel that can be carried on the resource is largest.

The data transmission apparatus provided by the embodiment of the present application can implement the technical solution described in the above method embodiments, and the implementation principle and beneficial effect thereof are similar, which will not be repeated here.

Figure 12:
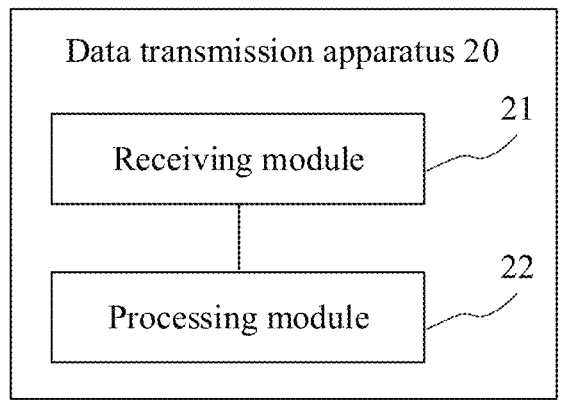
FIG. 12 is a schematic structural diagram of another data transmission apparatus provided by an embodiment of the present application.

FIG. 12 is a schematic structural diagram of another data transmission apparatus provided by an embodiment of the present application. The data transmission apparatus 20 can be provided in the second device, and the second device can be a terminal device or a network device. When the first device shown in FIG. 10-FIG. 11 is a terminal device, the second device is a network device, and when the first device is a network device, the second device is a terminal device. Referring to FIG. 12, the data transmission apparatus 20 includes a receiving module 21 and a processing module 22, where, the receiving module 21 is configured to receive data sent by a first device on a target resource, where the target resource is determined by the first device according to states of hybrid automatic repeat request HARQ processes corresponding to multiple available resources respectively from the multiple available resources; and the processing module 22 is configured to process the data.

The data transmission apparatus provided by the embodiment of the present application can implement the technical solution described in the above method embodiments, and the implementation principle and beneficial effect thereof are similar, which will not be repeated here.

In one possible implementation, the state of each of the HARQ processes is enable state or disable state.

In a possible implementation, the first device is a terminal device, and the second device is a network device; or the first device is a network device, and the second device is a terminal device.

Figure 13:
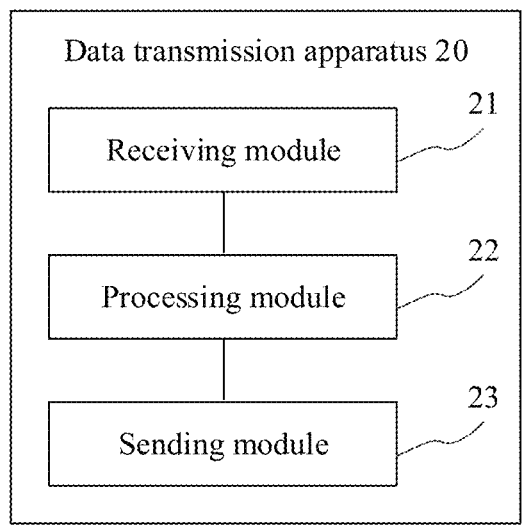
FIG. 13 is a schematic structural diagram of another data transmission apparatus provided by an embodiment of the present application.

FIG. 13 is a schematic structural diagram of another data transmission apparatus provided by an embodiment of the present application. On the basis of the embodiment shown in FIG. 12, referring to FIG. 13, the data transmission apparatus 20 further includes a sending module 23, where the sending module 23 is configured to send first configuration information to the first device, where the first configuration information includes any one of the following information:

a state of a HARQ process configured for the first device; or, the state of the HARQ process corresponding to the available resource.

In a possible implementation, the sending module 23 is specifically configured to: send second information to the first device, where the second information includes the first configuration information, and the second information is any one of the following: radio resource control RRC configuration information, media access control MAC control element CE, and downlink control information DCI.

In a possible implementation, the sending module 23 is configured to send first indication information to the first device, where the first indication information is used to indicate preferential selection of an available resource corresponding to a HARQ process in an enable state as the target resource, or, is used to indicate preferential selection of an available resource corresponding to a HARQ process in a disable state as the target resource.

In a possible implementation, the sending module 23 is specifically configured to: send first information to the first device, where the first information includes the first indication information; the first information is any one of the following: DCI, MAC CE, RRC configuration information.

In a possible implementation, the sending module 23 is configured to send second configuration information to the first device, where the second configuration information includes an attribute of at least one logical channel, where the attribute of each logical channel is any one of the following: enable HARQ feedback function, disable HARQ feedback function, enable or disable HARQ feedback function;

where a state of a HARQ process corresponding to the target resource matches with an attribute of a logical channel to which the data belongs.

In one possible implementation, the second configuration information further includes a priority of the at least one logical channel, and the attribute and/or the priority of the at least one logical channel is used by the first device to select the target resource from the multiple available resources.

In a possible implementation, the sending module 23 is specifically configured to: send dedicated information to the first device, where the dedicated information includes the second configuration information.

In a possible implementation, the sending module 23 is configured to send third configuration information to the first device, where the third configuration information includes: an attribute of at least one media access control MAC control element CE; where the attribute of each MAC CE is any one of the following: enable HARQ feedback function, disable HARQ feedback function, enable or disable HARQ feedback function;

where a state of a HARQ process corresponding to the target resource matches with an attribute of a MAC CE in the data.

In a possible implementation, the sending module 23 is specifically configured to: send dedicated information to the first device, where the dedicated information includes the third configuration information.

In a possible implementation, the sending module 23 is configured to send second indication information to the first device, where the second indication information is used to indicate a resource selection manner, and the resource selection manner is any one of the following:

performing resource selection according to the attribute and/or the priority of the logical channel first, then performing resource selection according to the states of the HARQ processes corresponding to the available resources; or, performing resource selection according to the states of the HARQ processes corresponding to the available resources first, and then performing resource selection according to the attribute and/or the priority of the logical channel.

In a possible implementation, the sending module 23 is configured to send third indication information to the first device, where the third indication information is used to indicate that a resource which is selected according to the attribute and/or the priority of the logical channel satisfies any one of the following conditions:

a priority of a logical channel that can be carried on the resource is highest; or;

a priority of a logical channel that can be carried on the resource is within a preset range; or;

a priority of a logical channel that can be carried on the resource is within a preset range, and a data amount of the logical channel that can be carried on the resource is largest.

The data transmission apparatus provided by the embodiment of the present application can implement the technical solution described in the above method embodiments, and the implementation principle and beneficial effect thereof are similar, which will not be repeated here.

Figure 14:
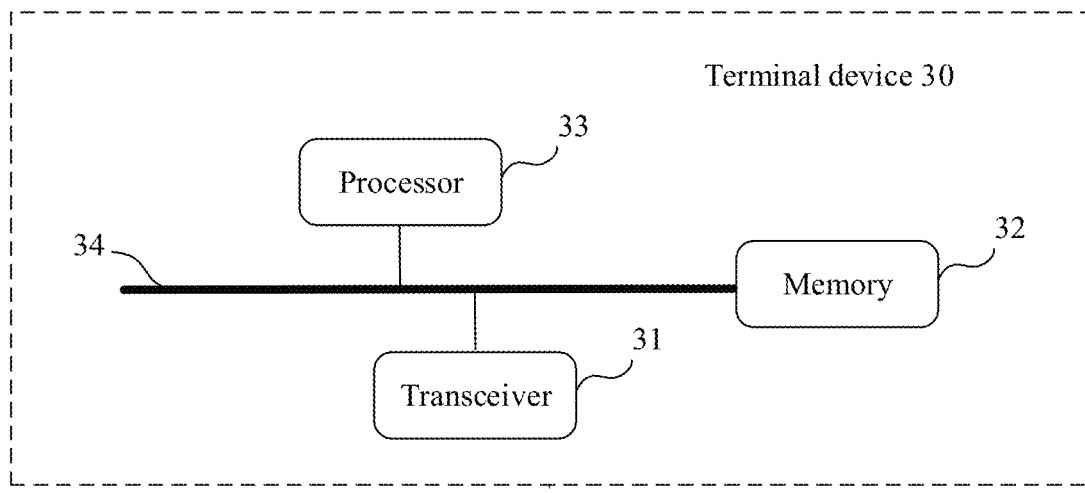
FIG. 14 is a schematic structural diagram of a terminal device provided by an embodiment of the present application.

FIG. 14 is a schematic structural diagram of a terminal device provided by an embodiment of the present application. Referring to FIG. 14, a terminal device 30 may include: a transceiver 31, a memory 32 and a processor 33. The transceiver 31 may include: a transmitter and/or a receiver. The transmitter can also be referred to as a transmitting component, a transmitting machine, a transmitting interface, a transmitting access, and other similar expressions, and the receiver can also be referred to as a receiving component, a receiving machine, a receiving interface, a receiving access or other similar expressions. Illustratively, the respective components of the transceiver 31, the memory 32 and the processor 33 are mutually connected through a bus 34.

The memory 32 is configured to store a program instruction;

the processor 33 is configured to execute the program instruction stored in the memory, to cause the terminal device 30 to implement the data transmission method according to any one of the above.

The receiver of the transceiver 31 can be configured to execute the receiving function of the terminal device in the above data transmission method. The transmitter of the transceiver 31 can be configured to execute the sending function of the terminal device in the above data transmission method.

Figure 15:
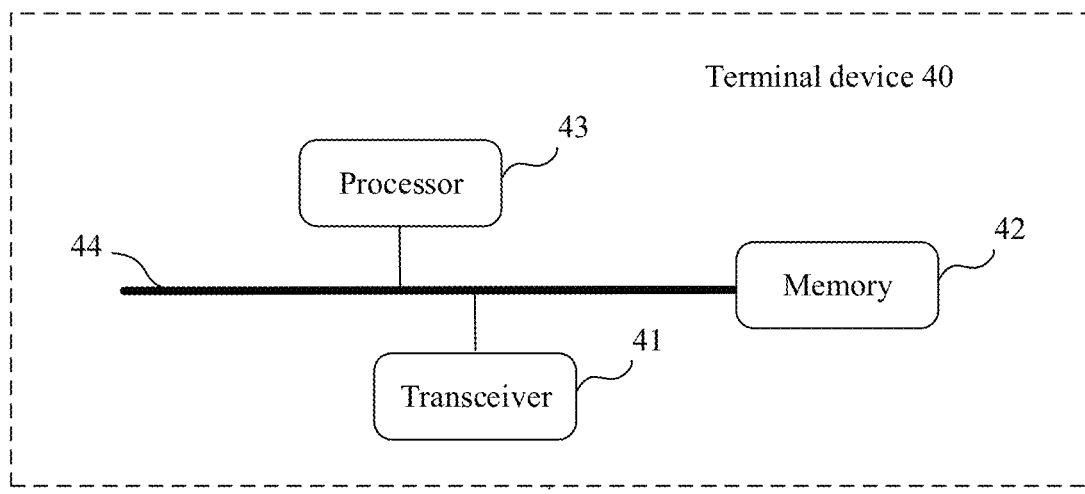
FIG. 15 is a schematic structural diagram of a network device provided by an embodiment of the present application.

FIG. 15 is a schematic structural diagram of a network device provided by an embodiment of the present application. Referring to FIG. 15, a network device 40 may include: a transceiver 41, a memory 42 and a processor 43. The transceiver 41 may include: a transmitter and/or a receiver. The transmitter can also be referred to as a transmitting component, a transmitting machine, a transmitting interface, a transmitting access, and other similar expressions, and the receiver can also be referred to as a receiving component, a receiving machine, a receiving interface, a receiving access or other similar expressions. Illustratively, the respective components of the transceiver 41, the memory 42 and the processor 43 are mutually connected through a bus 44.

The memory 42 is configured to store a program instruction;

the processor 43 is configured to execute the program instruction stored in the memory, to cause the terminal device 30 to implement the data transmission method according to any one of the above.

The transmitter of the transceiver 41 can be configured to execute the sending function of the network device in the above data transmission method.

An embodiment of the present application provides a computer-readable storage medium, where the computer-readable storage medium stores a computer-executable instruction, and the computer-executable instruction, when executed by a processor, is used to implement the above data transmission method.

An embodiment of the present application may further provide a computer program product, where the computer program product can be executed by a processor, and the computer program product, when executed, can implement any one of the above data transmission methods implemented by the terminal device as shown above.

An embodiment of the present application may further provide a computer program product, where the computer program product can be executed by a processor, and the computer program product, when executed, can implement any one of the above data transmission methods implemented by the network device as shown above.

The terminal device, computer-readable storage medium and computer program product of the embodiments of the present application can implement the data transmission method implemented by the terminal device, and the specific implementation process and beneficial effects thereof are described above, which will not be repeated here.

The network device, computer-readable storage medium and computer program product of the embodiments of the present application can implement the data transmission method implemented by the network device, and the specific implementation process and beneficial effects thereof are described above, which will not be repeated here.

All or part of the steps to implement the above-mentioned method embodiments can be completed by hardware related to program instructions. The above mentioned program can be stored in a readable memory. When the program is executed, the steps including the above method embodiments are executed; the above mentioned memory (storage medium) includes: a read-only memory (abbreviated as ROM), an RAM, a flash memory, a hard disk, a solid-state disk, a magnetic tape, a floppy disk, an optical disk (English: optical disc) and any combination thereof.

Embodiments of the present application are described with reference to flowcharts and/or block diagrams of methods, devices (systems), and computer program products according to embodiments of the present application. It should be understood that each flow and/or block in flowchart and/or block diagram, and combinations of flows and/or blocks in flowchart and/or block diagram can be implemented by computer program instructions. These computer program instructions may be provided to the processing unit of a general-purpose computer, a special-purpose computer, an embedded processor or other programmable data processing device to produce a machine, so that the instructions executed by the processing unit of the computer or other programmable data processing device generate a means configured to implement the functions specified in one or more flow charts and/or one or more blocks of the block diagram.

These computer program instructions can also be stored in a computer-readable memory that can direct a computer or other programmable data processing device to work in a specific way, so that the instructions stored in the computer-readable memory produce a manufacture including instruction means that implement the functions specified in one or more flow charts and/or one or more blocks of the block diagrams.

These computer program instructions can also be loaded on a computer or other programmable data processing device, so that a series of operation steps are executed on the computer or other programmable device to produce a computer-implemented process, so that the instructions executed on the computer or other programmable devices provide steps for implementing the functions specified in one or more flows of the flowchart and/or one or more blocks of the block diagram.

Obviously, those skilled in the art can make various changes and modifications to the embodiments of the present application without departing from the spirit and scope of the present application. In this way, if these modifications and variations of the embodiments of the present application fall within the scope of the claims of the present application and their technical equivalents, the present application is also intended to include these modifications and variations.

In the present application, terms "include" and variations thereof may refer to non-limiting inclusions; terms "or" and variations thereof may refer to "and/or". Terms "first", "second", etc., in the present application are used to distinguish similar objects, and are not necessarily used to describe specific sequence or order. In the present application, "multiple" refers to two or more. "And/or" describes an association relationship between associated objects, which represents three relationships may exist. For example, A and/or B may represents three circumstances that A exists alone, A and B exist at the same time, and B exists alone. Character "/" generally refers to an "or" relationship between associated objects.

What is claimed is:

1. A data transmission method, comprising:
determining, by a first device according to states of hybrid automatic repeat request (HARQ) processes corresponding to multiple available resources respectively, a target resource from the multiple available resources, wherein the multiple available resources are multiple configured grant resources or multiple dynamic grant resources; and
sending, by the first device, data to a second device on the target resource;
wherein before the determining, by the first device according to the states of HARQ processes corresponding to the multiple available resources respectively, the target resource from the multiple available resources, the method further comprises:
acquiring, by the first device, second configuration information, wherein the second configuration information comprises an attribute of at least one logical channel; wherein the attribute of each logical channel is any one of the following: enable HARQ feedback function, disable HARQ feedback function, enable or disable HARQ feedback function;
wherein a state of a HARQ process corresponding to the target resource matches with an attribute of a logical channel to which the data belongs;
wherein the second configuration information further comprises a priority of the at least one logical channel;
the determining, by the first device according to the states of HARQ processes corresponding to the multiple available resources respectively, the target resource from the multiple available resources comprises:

determining, by the first device according to at least one of the attribute and the priority of the at least one logical channel, and the states of the HARQ processes corresponding to the multiple available resources respectively, the target resource from the multiple available resources.

2. The method according to claim 1, wherein the state of each of the HARQ processes is an enable state or a disable state.

3. The method according to claim 1, wherein before the determining, by the first device according to the states of HARQ processes corresponding to the multiple available resources respectively, the target resource from the multiple available resources, the method further comprises:
acquiring, by the first device, first configuration information, wherein the first configuration information comprises any one of the following information:
a state of a HARQ process configured for the first device; or,
the state of the HARQ process corresponding to the available resource.

4. The method according to claim 3, wherein the first device is a terminal device, and the second device is a network device, the acquiring, by the first device, the first configuration information comprises:
receiving, by the first device, second information from the second device, wherein the second information comprises the first configuration information, and the second information is any one of the following: RRC configuration information, MAC CE, DCI.

5. The method according to claim 1, wherein before the determining, by the first device according to the states of HARQ processes corresponding to the multiple available resources respectively, the target resource from the multiple available resources, the method further comprises:
acquiring, by the first device, first indication information, wherein the first indication information is used to indicate preferential selection of an available resource corresponding to a HARQ process in an enable state as the target resource, or, is used to indicate preferential selection of an available resource corresponding to a HARQ process in a disable state as the target resource;
the determining, by the first device according to the states of HARQ processes corresponding to the multiple available resources respectively, the target resource from the multiple available resources comprises:
determining, by the first device according to the first indication information and the states of the HARQ processes corresponding to the multiple available resources respectively, the target resource from the multiple available resources.

6. The method according to claim 5, wherein the first device is a terminal device, and the second device is a network device, the acquiring, by the first device, the first indication information comprises:
receiving, by the first device, first information from the second device, wherein the first information comprises the first indication information, and the first information is any one of the following: downlink control information (DCI), MAC CE, and radio resource control (RRC) configuration information.

7. The method according to claim 1, wherein the determining, by the first device according to at least one of the attribute and the priority of the at least one logical channel, and the states of the HARQ processes corresponding to the multiple available resources respectively, the target resource from the multiple available resources comprises:
determining, by the first device according to the states of the HARQ processes corresponding to the multiple available resources respectively, a candidate resource from the multiple available resources; and
if a number of the determined candidate resources is multiple, determining, by the first device according to at least one of the attribute and the priority of the at least one logical channel, the target resource from the multiple candidate resources.

8. The method according to claim 1, wherein the determining, by the first device according to at least one of the attribute and the priority of the at least one logical channel, and the states of the HARQ processes respectively corresponding to the multiple available resources, the target resource from the multiple available resources comprises:
determining, by the first device according to at least one of the attribute and the priority of the at least one logical channel, a candidate resource from the multiple available resources; and
if a number of the determined candidate resources is multiple, determining, by the first device according to the states of the HARQ processes corresponding to the candidate resources, the target resource from the multiple candidate resources.

9. The method according to claim 1, wherein the method further comprises:
acquiring, by the first device, second indication information, wherein the second indication information is used to indicate a resource selection manner, and the resource selection manner is any one of the following:
performing resource selection according to at least one of the attribute and the priority of the logical channel first, then performing resource selection according to the states of the HARQ processes corresponding to the available resources; or,
performing resource selection according to the states of the HARQ processes corresponding to the available resources first, then performing resource selection according to at least one of the attribute and the priority of the logical channel.

10. The method according to claim 1, wherein the method further comprises:
acquiring, by the first device, third indication information, wherein the third indication information is used to indicate that a resource which is selected according to at least one of the attribute and the priority of the logical channel satisfies any one of the following conditions:
a priority of a logical channel that can be carried on the resource is highest; or;
a priority of a logical channel that can be carried on the resource is within a preset range; or;
a priority of a logical channel that can be carried on the resource is within a preset range, and a data amount of the logical channel that can be carried on the resource is largest.

11. The method according to claim 1, wherein the first device is a terminal device, and the second device is a network device, the acquiring, by the first device, the second configuration information comprises:
receiving, by the first device, dedicated information from the second device, wherein the dedicated information comprises the second configuration information.

12. The method according to claim 1, wherein before the determining, by the first device according to the states of HARQ processes corresponding to the multiple available resources respectively, the target resource from the multiple available resources, the method further comprises:

acquiring, by the first device, third configuration information, wherein the third configuration information comprises: an attribute of at least one media access control (MAC) control element (CE); wherein the attribute of each MAC CE is any one of the following: enable HARQ feedback function, disable HARQ feedback function, enable or disable HARQ feedback function;

wherein a state of a HARQ process corresponding to the target resource matches with an attribute of a MAC CE in the data.

13. The method according to claim 1, wherein, the first device is a terminal device, and the second device is a network device; or the first device is a network device, and the second device is a terminal device.

14. A terminal device, comprising: a transceiver, a processor and a memory;

the memory stores a computer-executable instruction;

the processor executes the computer-executable instruction stored in the memory, to cause the processor to execute the data transmission method according to claim 1.

15. A non-transitory computer-readable storage medium, wherein the computer-readable storage medium stores a computer-executable instruction, and the computer-executable instruction, when executed by a processor, is used to implement the data transmission method according to claim 1.

16. A data transmission method, comprising:

receiving, by a second device, data sent by a first device on a target resource, wherein the target resource is determined by the first device according to states of hybrid automatic repeat request (HARQ) processes corresponding to multiple available resources respectively from the multiple available resources; and processing, by the second device, the data;

wherein before the receiving, by the second device, data sent by the first device on the target resource, the method further comprises:

sending, by the second device, second configuration information, wherein the second configuration information comprises an attribute of at least one logical channel; wherein the attribute of each logical channel is any one of the following: enable HARQ feedback function, disable HARQ feedback function, enable or disable HARQ feedback function;

wherein a state of a HARQ process corresponding to the target resource matches with an attribute of a logical channel to which the data belongs;

wherein the second configuration information further comprises a priority of the at least one logical channel, and the attribute and/or the priority of the at least one logical channel is used by the first device to select the target resource from the multiple available resources.

17. A network device, comprising: a transceiver, a processor and a memory;

the memory stores a computer-executable instruction;

the processor executes the computer-executable instruction stored in the memory, to cause the processor to execute the data transmission method according to claim 16.

18. A non-transitory computer-readable storage medium, wherein the computer-readable storage medium stores a computer-executable instruction, and the computer-executable instruction, when executed by a processor, is used to implement the data transmission method according to claim 16.

* * * * *